(12) United States Patent
Li

(10) Patent No.: US 12,125,473 B2
(45) Date of Patent: Oct. 22, 2024

(54) SPEECH RECOGNITION METHOD, APPARATUS, AND DEVICE, AND STORAGE MEDIUM

(71) Applicant: Tencent Technology (Shenzhen) Company Limited, Shenzhen (CN)

(72) Inventor: Tao Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 645 days.

(21) Appl. No.: 17/192,316

(22) Filed: Mar. 4, 2021

(65) Prior Publication Data

US 2021/0193121 A1  Jun. 24, 2021

Related U.S. Application Data

(63) Continuation of application No. PCT/CN2019/120558, filed on Nov. 25, 2019.

(30) Foreign Application Priority Data

Dec. 11, 2018 (CN) .......................... 201811508402.7

(51) Int. Cl.
*G10L 15/06* (2013.01)
*G10L 15/02* (2006.01)
*G10L 15/10* (2006.01)

(52) U.S. Cl.
CPC ............ *G10L 15/063* (2013.01); *G10L 15/02* (2013.01); *G10L 15/10* (2013.01)

(58) Field of Classification Search
CPC ....... G10L 15/063; G10L 15/02; G10L 15/10; G10L 15/183; G10L 15/22; G10L 2015/0631; G10L 2015/0635
See application file for complete search history.

(56) References Cited

U.S. PATENT DOCUMENTS 9,292,487 B1 * 3/2016 Weber ................. G10L 15/063
9,514,747 B1 * 12/2016 Bisani .................... G10L 25/60
(Continued)

FOREIGN PATENT DOCUMENTS

CN 105810193 A 7/2016
CN 105869629 A 8/2016
(Continued)

OTHER PUBLICATIONS

Holzmann, Gerard J., et al. "On nested depth first search." The Spin Verification System 32 (1996): 81-89 (Year: 1996).*
(Continued)

*Primary Examiner* — Paras D Shah
(74) *Attorney, Agent, or Firm* — Crowell & Moring LLP

(57) ABSTRACT

Embodiments of this disclosure disclose a speech recognition method, apparatus, and device, and a storage medium. The method in the embodiments of this disclosure includes: adjusting a probability of a relationship between at least one pair of elements in a language recognition model according to a probability of the relationship between the at least one pair of elements in a textual segment; inputting a to-be-recognized speech into a speech recognition model including the language recognition model; and determining, according to the adjusted probability of relationship between the at least one tone pair of elements in the language recognition model, a sequence of elements corresponding to the to-be-recognized speech as a speech recognition result.

16 Claims, 10 Drawing Sheets

(56) References Cited

U.S. PATENT DOCUMENTS

| | | | |
|---|---|---|---|
| 9,966,066 B1* | 5/2018 | Corfield | G10L 15/142 |
| 10,140,981 B1* | 11/2018 | Filimonov | G10L 15/183 |
| 10,943,583 B1* | 3/2021 | Gandhe | G10L 15/183 |
| 11,043,214 B1* | 6/2021 | Hedayatnia | G06N 20/10 |
| 2013/0185073 A1 | 7/2013 | Saffer | |
| 2014/0303973 A1* | 10/2014 | Amarilli | G10L 15/08 |
| | | | 704/235 |
| 2014/0304205 A1* | 10/2014 | Fastow | G10L 15/32 |
| | | | 706/47 |
| 2015/0269280 A1* | 9/2015 | Astier | G06F 16/9024 |
| | | | 707/798 |
| 2016/0188573 A1* | 6/2016 | Tang | G06F 40/284 |
| | | | 704/9 |
| 2016/0379629 A1* | 12/2016 | Hofer | G06F 40/289 |
| | | | 704/257 |
| 2017/0018268 A1 | 1/2017 | Quast | |
| 2018/0053502 A1* | 2/2018 | Biadsy | G10L 15/08 |
| 2018/0075359 A1* | 3/2018 | Brennan | G06N 5/022 |
| 2018/0366112 A1* | 12/2018 | Aleksic | G10L 15/22 |

FOREIGN PATENT DOCUMENTS

| | | |
|---|---|---|
| CN | 106683677 A | 5/2017 |
| CN | 107146604 A | 9/2017 |
| CN | 107665705 A | 2/2018 |
| CN | 108711422 A | 10/2018 |
| CN | 108735201 A | 11/2018 |
| CN | 110176230 A | 8/2019 |

OTHER PUBLICATIONS

Mohri, Mehryar, et al. "Weighted finite-state transducers in speech recognition." Computer Speech & Language 16.1 (2002): pp. 69-88 (Year: 2002).*

Luo, Jun, et al. "Modeling characters versus words for mandarin speech recognition." 2009 IEEE International Conference on Acoustics, Speech and Signal Processing. IEEE, 2009, pp. 4325-4328 (Year: 2009).*

Povey, Daniel, et al. "Generating exact lattices in the WFST framework." 2012 IEEE International Conference on Acoustics, Speech and Signal Processing (ICASSP). IEEE, 2012, pp. 4213-4216 (Year: 2012).*

Guo, Yuhong, et al. "Optimized large vocabulary WFST speech recognition system." 2012 9th International Conference on Fuzzy Systems and Knowledge Discovery. IEEE, 2012, pp. 1-5 (Year: 2012).*

Ristoski, Petar, et al. "Rdf2vec: Rdf graph embeddings for data mining." The Semantic Web—ISWC 2016: 15th International Semantic Web Conference, Kobe, Japan, Oct. 17-21, 2016, pp. 498-514 (Year: 2016).*

International Search Report and Written Opinion with English Translation for International Application No. PCT/CN2019/120558 dated Feb. 12, 2020, 12 pages.

Office Action for Chinese Patent Application No. 201811508402.7 dated Mar. 1, 2021; 9 pages.

* cited by examiner

SPEECH RECOGNITION METHOD, APPARATUS, AND DEVICE, AND STORAGE MEDIUM

RELATED APPLICATION

This application is a continuation application of the International PCT Application No. PCT/CN2019/120558, filed with the China National Intellectual Property Administration, PRC on Nov. 25, 2019 which claims priority to Chinese Patent Application No. 201811508402.7, filed with the China National Intellectual Property Administration, PRC on Dec. 11, 2018, both of which are incorporated herein by reference in their entireties.

FIELD OF THE TECHNOLOGY

This application relates to computer technologies, and specifically, to a method, an apparatus, a device, and a storage medium for speech recognition.

BACKGROUND OF THE DISCLOSURE

The speech recognition technology can convert a human speech into corresponding characters or codes, and is widely applied to fields such as smart home and real-time phonetic transcription. A decoder searches, according to a human speech, for an optimum word sequence in a search space formed by knowledge sources such as an acoustic model, a dictionary, and a language model. A textual description corresponding to the speech, that is, a recognition result, may be obtained by combining the obtained word sequences.

Currently, a language recognition model used for speech recognition is usually obtained by pruning a large language model. The pruned language model may cause a decrease in the accuracy of speech recognition.

SUMMARY

Embodiments of this disclosure provide a speech recognition method, apparatus, and device, and a storage medium, to improve the accuracy of speech recognition.

An embodiment of this disclosure provides a speech recognition method, including:
  adjusting a probability of a relationship between at least one pair of elements in a language recognition model according to a probability of the relationship between the at least one pair of elements in a textual segment;
  inputting a to-be-recognized speech into a preset speech recognition model, the speech recognition model including the language recognition model; and
  determining, according to probabilities of relationships between elements in the language recognition model, a sequence of a plurality of elements corresponding to the to-be-recognized speech as a speech recognition result.

In some embodiments, the method may include:
  loading a preset first state diagram and a preset second state diagram, the first state diagram being a state diagram of a key phrase language model, the second state diagram being a state diagram of a large language model;
  extracting a reference edge from the first state diagram, and searching the second state diagram for an edge having the same label as the reference edge, to serve as a key phrase edge;
  obtaining a weight of the reference edge, and updating a weight of the key phrase edge according to the weight of the reference edge;
  configuring the updated weight of the key phrase edge in the second state diagram as an incentive weight of a corresponding edge in the language recognition model, the language recognition model being a language model obtained after the large language model is pruned;
  inputting the to-be-recognized speech into the preset speech recognition model, to obtain word sequence paths outputted by the speech recognition model, the speech recognition model including the language recognition model; and
  selecting a target path from the word sequence paths according to the incentive weight of the edge in the language recognition model, to obtain the speech recognition result.

In some embodiments, the extracting a reference edge from the first state diagram includes:
  obtaining an initial node of the first state diagram, and determining the reference edge according to a preset traversal depth and the initial node.

In some embodiments, the obtaining the reference edge according to a preset traversal depth and the initial node includes:
  determining an output edge of the initial node as a first reference edge;
  performing recursion on the first reference edge within a preset recursion depth, to obtain recursion edges of the first reference edge; and
  determining the recursion edge as a second reference edge when an output label of the recursion edge is not a preset symbol.

In some embodiments, the searching the second state diagram for an edge having the same label as the reference edge, to serve as a key phrase edge includes:
  searching the second state diagram for an edge having the same label as the first reference edge, to serve as a first key phrase edge; and
  searching recursion edges of the first key phrase edge for an edge having the same label as the second reference edge, to serve as a second key phrase edge.

In some embodiments, the updating a weight of the key phrase edge according to the weight of the reference edge includes:
  obtaining a preset interpolation parameter and an initial weight of the key phrase edge;
  calculating a target weight of the key phrase edge according to the weight of the reference edge, the interpolation parameter, and the initial weight of the key phrase edge; and
  replacing the initial weight of the key phrase edge in the second state diagram with the target weight.

In some embodiments, the method further includes:
  mapping, when an edge having the same label as the reference edge is not found in the second state diagram, the reference edge into the second state diagram, to obtain the key phrase edge.

In some embodiments, the method further includes:
  selecting, from the second state diagram, an edge whose label is the same as a word in a preset word list as a key phrase initial edge;
  obtaining an initial weight of the key phrase initial edge, and updating a weight of the key phrase initial edge according to a preset scale factor and the initial weight of the key phrase initial edge; and configuring the updated weight of the key phrase initial edge in the second state diagram as an incentive weight of a corresponding edge in the language recognition model.

In some embodiments, before the selecting, from the second state diagram, an edge whose label is the same as a word in a preset word list as a key phrase initial edge, the method includes:

performing word segmentation on the key phrase, and configuring the first word obtained through word segmentation into the preset word list.

In some embodiments, the method further includes:

obtaining a preset key phrase, and training the key phrase language model according to the key phrase; and constructing a weighted finite-state transducer of the key phrase language model, and obtaining a state diagram indicated by the weighted finite-state transducer of the key phrase language model as the first state diagram.

In some embodiments, the method further includes:

obtaining a preset general corpus, and training the large language model according to the general corpus; and constructing a weighted finite-state transducer of the large language model, and obtaining a state diagram indicated by the weighted finite-state transducer of the large language model as the second state diagram.

In some embodiments, the method further includes:

acquiring a to-be-recognized speech in real time.

According to an embodiment of this disclosure, another speech recognition method may include:

providing a textual segment to a second computing device;

obtaining a language recognition model provided by the second computing device, a probability of a relationship between at least one pair of elements in the language recognition model being adjusted by using a probability of the relationship between the at least one pair of elements in the textual segment;

inputting a to-be-recognized speech into a preset speech recognition model, the speech recognition model including the language recognition model; and determining, according to probabilities of relationships between elements in the language recognition model, a sequence of a plurality of elements corresponding to the to-be-recognized speech as a speech recognition result.

An embodiment of this disclosure further provides a speech recognition apparatus, including:

an adjustment module, configured to adjust a probability of a relationship between at least one pair of elements in a language recognition model according to a probability of the relationship between the at least one pair of elements in a textual segment; and a speech recognition module, configured to input a to-be-recognized speech into a preset speech recognition model, the speech recognition model including the language recognition model; and determine, according to probabilities of relationships between elements in the language recognition model, a sequence of a plurality of elements corresponding to the to-be-recognized speech as a speech recognition result.

In some embodiments, the speech recognition apparatus may include:

a loading unit, configured to load a preset first state diagram and a preset second state diagram, the first state diagram being a state diagram of a key phrase language model, the second state diagram being a state diagram of a large language model;

a key phrase unit, configured to extract a reference edge from the first state diagram, and search the second state diagram for an edge having the same label as the reference edge, to serve as a key phrase edge;

an update unit, configured to obtain a weight of the reference edge, and update a weight of the key phrase edge according to the weight of the reference edge;

an incentive unit, configured to configure the updated weight of the key phrase edge in the second state diagram as an incentive weight of a corresponding edge in the language recognition model, the language recognition model being a language model obtained after the large language model is pruned;

a recognition unit, configured to input the to-be-recognized speech into the preset speech recognition model, to obtain word sequence paths outputted by the speech recognition model, the speech recognition model including the language recognition model; and a result unit, configured to select a target path from the word sequence paths according to the incentive weight of the edge in the language recognition model, to obtain the speech recognition result.

An embodiment of this disclosure further provides a speech recognition device, including a memory, a processor, and a speech recognition program stored in the memory and capable of being run on the processor, the speech recognition program, when executed by the processor, implementing operations of any speech recognition method according to the embodiments of this disclosure.

In some embodiments, the device further includes a speech acquisition apparatus. The speech acquisition apparatus is configured to acquire a to-be-recognized speech in real time.

An embodiment of this disclosure further provides a storage medium, storing a plurality of instructions, the instructions being suitable to be loaded by a processor, to perform operations of any speech recognition method according to the embodiments of this disclosure.

In the embodiments of this disclosure, a preset first state diagram and a preset second state diagram may be loaded, the first state diagram being a state diagram of a key phrase language model, the second state diagram being a state diagram of a large language model; a reference edge is extracted from the first state diagram, and an edge having the same label as the reference edge is searched for in the second state diagram, to serve as a key phrase edge; a weight of the reference edge is obtained, and a weight of the key phrase edge is updated according to the weight of the reference edge; the updated weight of the key phrase edge in the second state diagram is configured as an incentive weight of a corresponding edge in a language recognition model, the language recognition model being a language model obtained after the large language model is pruned; a to-be-recognized speech is inputted into a preset speech recognition model, to obtain word sequence paths outputted by the speech recognition model, the speech recognition model including the language recognition model; and a target path is selected from the word sequence paths according to the incentive weight of the edge in the language recognition model, to obtain a speech recognition result. A corpus of the key phrase language model is much smaller than a corpus of the large language model. Therefore, a weight of a key phrase edge in the first state diagram is greater than a weight of the same key phrase edge in the second state diagram. In this solution, a weight of a key phrase edge in the first state diagram is used to enhance a weight of the same key phrase edge in the second state diagram, to stimulate a weight of the key phrase edge in the speech recognition model, so that during speech recognition, a weight of an edge in a path that includes a key phrase in the language recognition model is improved, thereby improving a probability that the path including the key phrase is used as a recognition result. Therefore, this solution improves a probability of occurrence of a key phrase in a speech recognition result, thereby ensuring the speech recognition speed and improving the accuracy of the speech recognition result. In addition, this solution is applicable to various scenarios, and key phrases in various scenarios may be used to improve the accuracy of a speech recognition result.

BRIEF DESCRIPTION OF THE DRAWINGS

To describe the technical solutions in the embodiments of this disclosure more clearly, the following briefly describes accompanying drawings required for describing the embodiments. Apparently, the accompanying drawings in the following description show merely some embodiments of this disclosure, and a person skilled in the art may still derive other drawings from these accompanying drawings without creative efforts.

DESCRIPTION OF EMBODIMENTS

The technical solutions in the embodiments of this disclosure are clearly described in the following with reference to the accompanying drawings in the embodiments of this disclosure. The described embodiments are merely some rather than all of the embodiments of this disclosure. All other embodiments obtained by a person skilled in the art based on the embodiments of this disclosure without creative efforts shall fall within the protection scope of this application.

A speech recognition method, apparatus, and device, and a storage medium are provided in the embodiments of this disclosure.

An embodiment of this disclosure provides an information exchange system. The system includes a speech recognition apparatus according to any embodiment of this disclosure, and other devices such as a server and a terminal. The speech recognition apparatus may be integrated in a device such as a server or a terminal. The terminal may be a device such as a mobile terminal or a personal computer (PC).

Figure 1A:
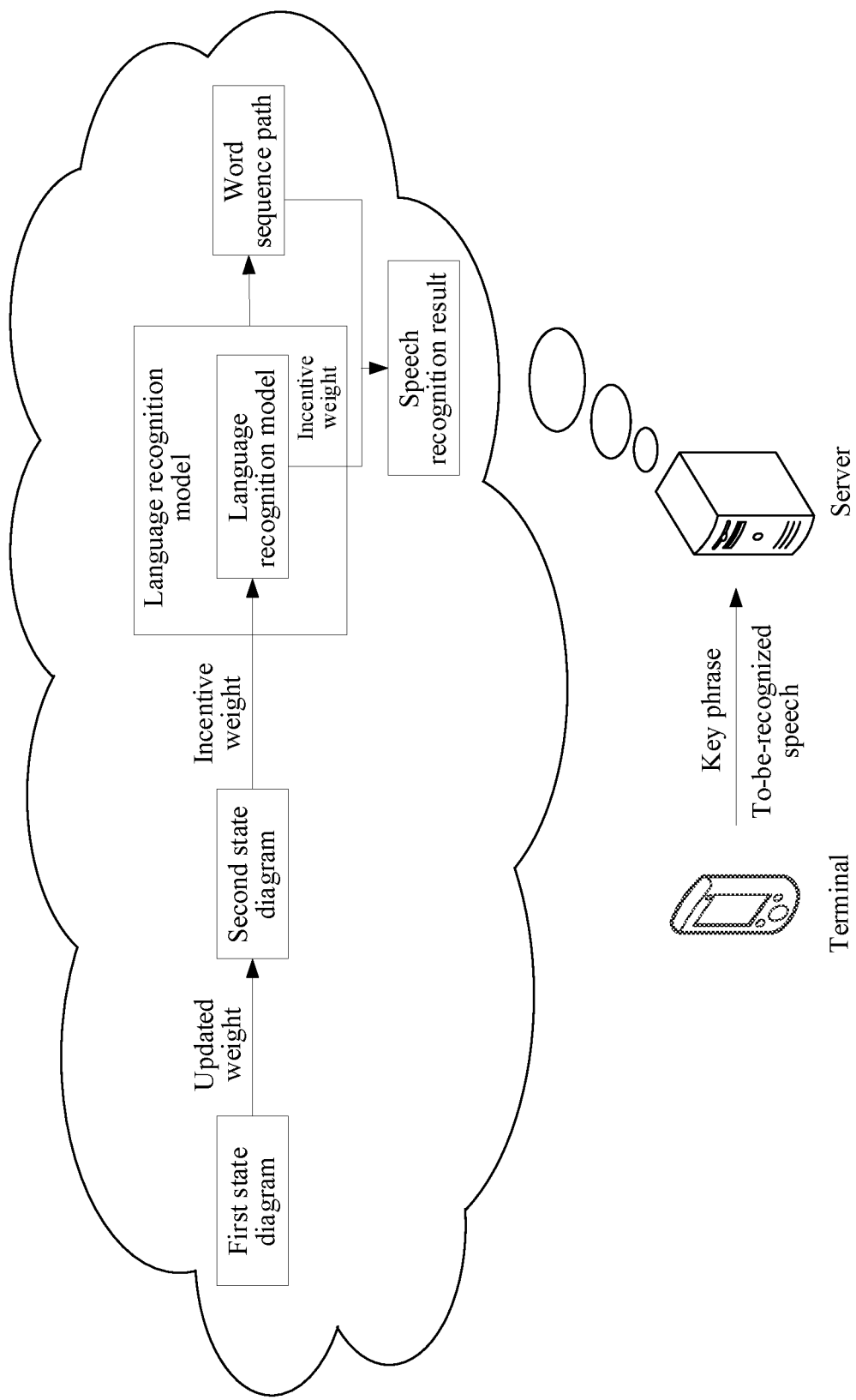
FIG. 1a is a schematic diagram of a scenario of an information exchange system according to an embodiment of this disclosure.
Figure 1B:
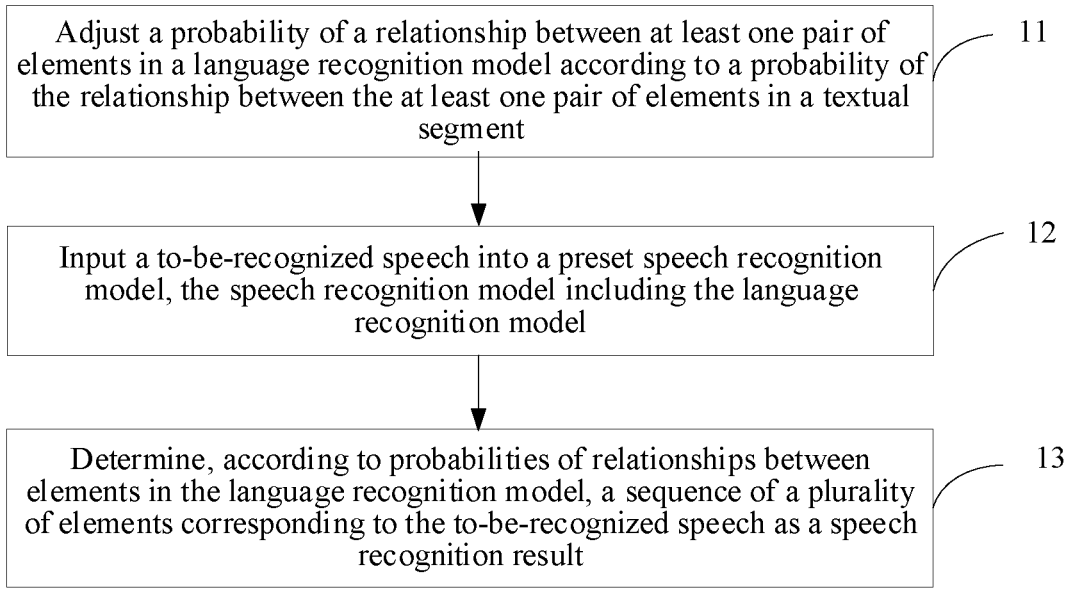
FIG. 1b is a schematic flowchart of a speech recognition method according to an embodiment of this disclosure.

Referring to FIG. 1a, this embodiment of this disclosure provides an information exchange system, including a server and a terminal. In some embodiments, the speech recognition apparatus may be integrated in the server. In some embodiments, the speech recognition apparatus may alternatively be integrated in the terminal. The speech recognition apparatus may perform the speech recognition method in the embodiments. FIG. 1b is a schematic flowchart of a speech recognition method according to an embodiment of this disclosure. As shown in FIG. 1b, the method may include the following steps.

Step 11: Adjust a probability of a relationship between at least one pair of elements in a language recognition model according to a probability of the relationship between the at least one pair of elements in a textual segment.

In this specification, a textual segment is a text that has a specific meaning as a whole. The textual segment generally includes a plurality of morphemes, which may be, for example, terms, phrases, textual expressions, and the like. The textual segment used in step 11 may be a text for which a recognition rate needs to be improved during speech recognition, and is also referred to as a key phrase hereinafter.

Step 12: Input a to-be-recognized speech into a preset speech recognition model, the speech recognition model including the language recognition model.

Step 13: Determine, according to probabilities of relationships between elements in the language recognition model, a sequence of elements corresponding to the to-be-recognized speech as a speech recognition result.

When a textual segment is given, elements in the textual segment has a closer relationship than the same elements in a basic corpus on which the language recognition model is based. Therefore, the probability of the relationship between the elements in the language recognition model is adjusted according to the probability of the relationship between the elements in the given textual segment, so that the language recognition model achieves a higher recognition rate for the textual segment, thereby improving a speech recognition rate of the textual segment. In some implementations, there may be various textual segments corresponding to different fields or technologies, such as medicine, physics, computer technology, and the like. A particular textual segment may be chosen based on the particular use case of the speech recognition model. Furthermore, various textual segments may share a common basic corpus.

Figure 1C:
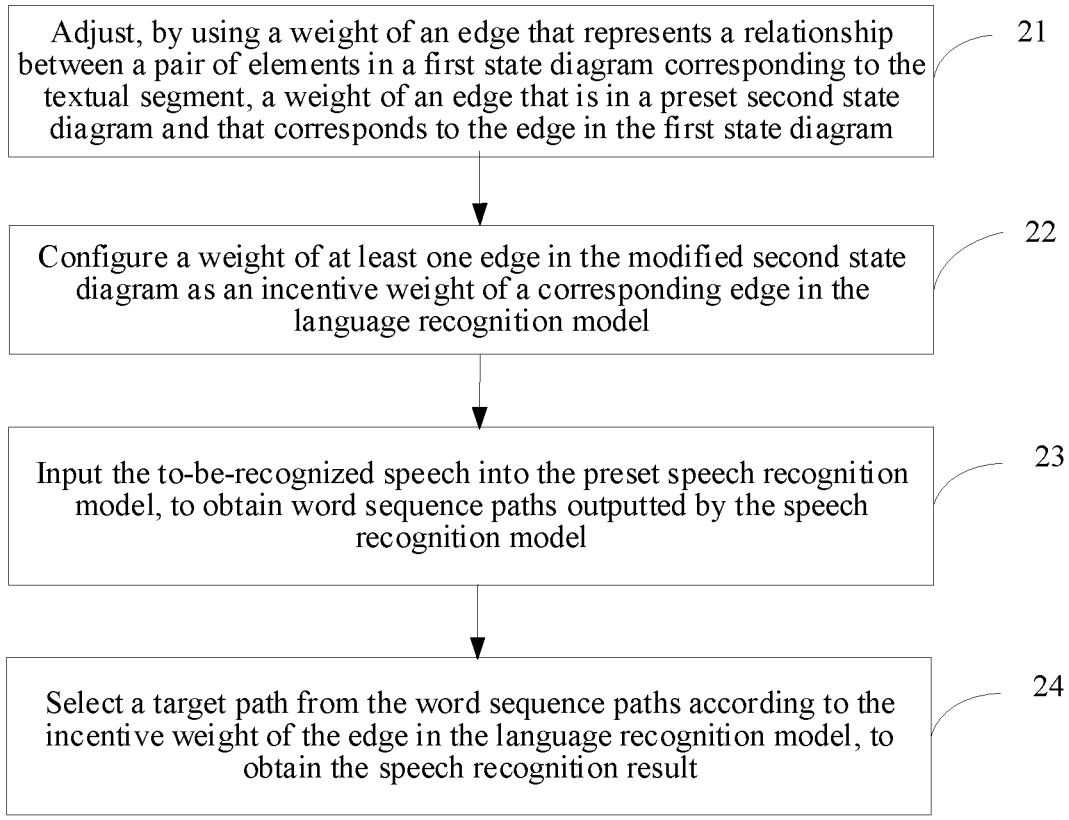
FIG. 1c is a schematic flowchart of a speech recognition method according to an embodiment of this disclosure.

In step 11, the probability of the relationship between the at least one pair of elements in the textual segment may be obtained by using a natural language processing technology. For example, the probability may be obtained by establishing a language model of the textual segment. In this case, the speech recognition method may be as shown in FIG. 1c, and includes the following steps.

Step 21: Adjust, by using a weight of an edge that represents a relationship between a pair of elements in a first state diagram corresponding to the textual segment, a weight of an edge that is in a preset second state diagram and that corresponds to the edge in the first state diagram.

The first state diagram may be a state diagram of a language model of the textual segment, and the second state diagram may be a state diagram of a basic language model.

In some implementations, the first state diagram includes a weighted directed state diagram of the language model corresponding to the textual segment (also referred to as a key language model or a key phrase language model for short hereinafter), and records directed connection relationships between nodes, to describe possible states of key phrase objects in the key language model and a transfer path of the states. The key phrase object is a language element in the textual segment. The nodes represent the states of the key phrase objects. The nodes are connected in sequence to form directed edges, and the edges are connected to form a transfer path of the key phrases. Each path is a word sequence path of the key phrases, and includes key phrase objects and an output sequence of the key phrase objects.

The key language model may be a language model constructed according to a preset textual segment, for example, an n-gram (n-gram language model). In this embodiment, descriptions are provided by using an example in which n is 3, and the key language model is a third-order tri-gram (tri-gram language model). That is, occurrence of the third word in the key language model is only related to the previous two words, and is not related to any other words. It is to be understood that there is no limitation on what type of key language model may be chosen in this disclosure.

The second state diagram may be a directed state diagram of the preset basic language model (also referred to as a large language model), and records directed connection relationships between nodes, to describe possible states of word objects in the basic language model and a transfer path of the states. The basic language model may be a large-scale language model that is rich in corpus information and that has not been pruned. The nodes are the states of the word objects. The nodes are connected in sequence to form directed edges, and the edges are connected to form a transfer path of the words. Each path is a word sequence path of the words, and includes word objects and an output order of the word objects. In the second state diagram, each edge has a corresponding label and weight. The label includes an input label and an output label. In some implementations, the input label may be the same as the output label, which are both a word object. The weight represents a probability that the edge appears in a transfer path. The weight may be a probability value, or may be calculated according to a probability value. In some implementations, a probability value may also be calculated or set according to a weight. It is to be understood that, in some implementations, an edge in a state diagram may have a corresponding edge in the language model corresponding to the state diagram. For example, the correspondence relationship may be determined by a label, or an ID of the edge.

In different language models, weights of edges with the same label in the first state diagram and the second state diagram may be different.

In some embodiments, the adjustment step (i.e., step 21) may include: extracting the edge from the first state diagram as a reference edge, and searching the second state diagram for an edge having the same label as the reference edge, to serve as a target edge; and obtaining a weight of the reference edge, and updating a weight of the target edge according to the weight of the reference edge. A specific method of this embodiment is described below with reference to FIG. 1d.

In some embodiments, the adjustment step may include: adding an edge corresponding to the edge in the first state diagram as a target edge in the second state diagram; and setting a weight of the target edge according to the weight of the edge. A specific method of this embodiment is described below with reference to FIG. 2.

Step 22: Set an incentive weight of an edge in the language recognition model to a weight of the corresponding edge in the modified second state diagram.

The language recognition model is a language model obtained after the basic language model is pruned.

Step 23: Input the to-be-recognized speech into the preset speech recognition model, to obtain word sequence paths outputted by the speech recognition model.

The speech recognition model includes the language recognition model.

Step 24: Select a target path from the word sequence paths according to the incentive weight of the edge in the language recognition model, to obtain the speech recognition result.

Figure 1D:
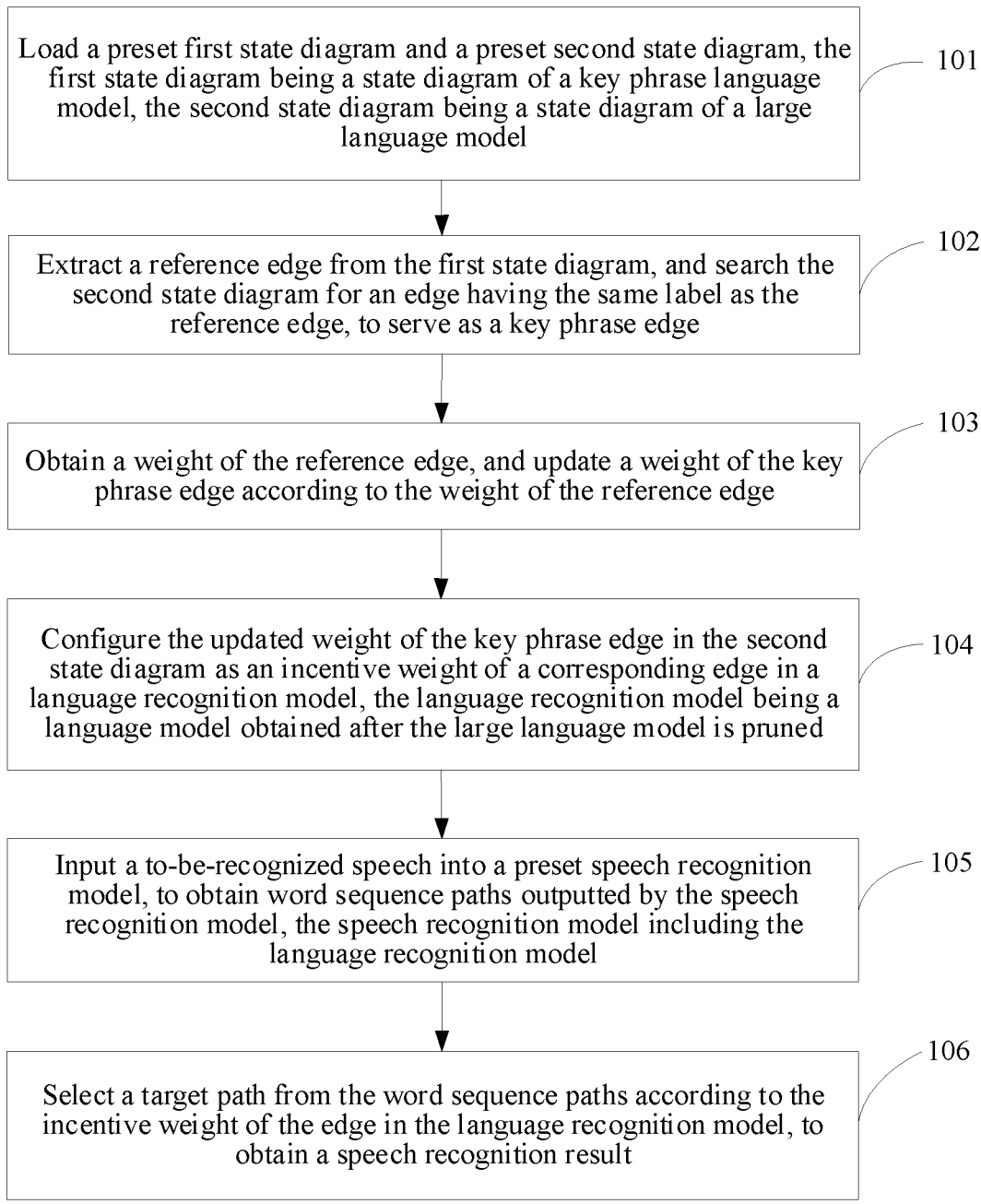
FIG. 1d is a schematic flowchart of a speech recognition method according to an embodiment of this disclosure.

As described above, the method of adjusting a weight of an edge in the second state diagram in step 21 may include adjusting a weight of a corresponding edge that already exists in the second state diagram. In this case, the speech recognition method may be as shown in FIG. 1d, and includes the following steps.

101: Load a preset first state diagram and a preset second state diagram, the first state diagram being a state diagram of a language model corresponding to a textual segment, the second state diagram being a state diagram of a basic language model.

In some embodiments, the speech recognition apparatus may train the language model according to a textual segment, to obtain the first state diagram. The textual segment may be a related corpus in the field of the to-be-recognized speech, and may specifically be configured flexibly as required. There may be one or more textual segments. In some embodiments, when the speech recognition apparatus is deployed in a server, the textual segment may be a textual segment that needs to be enhanced and is inputted or selected by a user by using a terminal, and the terminal sends the textual segment inputted by the user to the server; alternatively, the textual segment may be a textual segment that is directly inputted or selected by the user in the server. In some other embodiments, the speech recognition apparatus may alternatively obtain the textual segment from a specified storage location (local or remote).

In some embodiments, the speech recognition apparatus may obtain a preset textual segment, train the key language model according to the textual segment, construct a weighted finite-state transducer of the key language model, and obtain a state diagram indicated by the weighted finite-state transducer of the key language model as the first state diagram.

The weighted finite-state transducer may be referred to as WFST for short in this embodiment. The WFST can recognize an entire path from an initial state to an end state of a word, where a state of a word may be understood as a node. The nodes are connected in sequence to form directed edges. Each edge has a corresponding label and weight. The label includes an input label and an output label, and the input label may be the same as the output label. The weight represents a probability that the edge appears in the entire path. The weight may be a probability value, or may be calculated according to a probability value. A probability of the entire path may be calculated according to the weights or probabilities of all the edges in the path.

The speech recognition apparatus uses the textual segment as a training corpus, and inputs the textual segment into the tri-gram for training, to obtain the key language model. Then, the speech recognition apparatus constructs the weighted finite-state transducer of the key language model. Therefore, the speech recognition apparatus may obtain nodes in the WFST of the key language model and connection relationships between the nodes, to obtain the state diagram indicated by the WFST of the key language model, and use the state diagram indicated by the WFST of the key language model as the first state diagram.

In some embodiments, the speech recognition apparatus may obtain a preset general corpus, train the basic language model according to the general corpus, construct a weighted finite-state transducer of the basic language model, and obtain a state diagram indicated by the weighted finite-state transducer of the basic language model as the second state diagram. The general corpus may be a commonly used large-scale corpus.

The speech recognition apparatus inputs the general corpus into a preset language model, for example, a second-order bi-gram (bi-gram language model), for training, to obtain the basic language model. Then, the speech recognition apparatus constructs the weighted finite-state transducer of the basic language model. Therefore, the speech recognition apparatus may obtain nodes in the WFST of the basic language model and connection relationships between the nodes, to obtain the state diagram indicated by the WFST of the basic language model, and use the state diagram indicated by the WFST of the basic language model as the second state diagram.

A quantity of textual segments in the WFST of the key language model is much smaller than a quantity of corpora in the WFST of the basic language model. Therefore, a weight of an edge in the WFST of the key language model is greater than a weight of the same edge in the WFST of the basic language model. Therefore, a weight of an edge in the first state diagram is greater than a weight of the same edge in the second state diagram.

The speech recognition apparatus loads the first state diagram and the second state diagram simultaneously before or during speech recognition.

102: Extract a reference edge from the first state diagram, and search the second state diagram for an edge having the same label as the reference edge, to serve as a target edge.

The reference edge is an edge in the first state diagram. In some embodiments, an edge whose output label is related to a preset key phrase may be used as the reference edge. In some other embodiments, alternatively, all edges in the first state diagram may be used as reference edges, and subsequent steps are performed.

In the first state diagram, each edge has a corresponding label and weight. The label includes an input label and an output label. The input label may be the same as the output label, which are both a key phrase object. The weight represents a probability that the edge appears in a transfer path. The weight may be a probability value, or may be calculated according to a probability value. Using any edge in the first state diagram as an example, with 10 or e as a base, a logarithm (log) value of the probability of the edge may be calculated. The logarithm value may be used as the weight of the edge.

If the reference edge includes a prefix path, then an edge having the same prefix path and the same label is the target edge corresponding to the reference edge.

The speech recognition apparatus first extracts the reference edge from the first state diagram. For example, an initial node of the first state diagram may be obtained, and the reference edge is obtained according to a preset traversal depth and the initial node.

In some embodiments, the step of "obtaining an initial node of the first state diagram, and obtaining the reference edge according to a preset traversal depth and the initial node" may include: determining an output edge (may also be referred to as outgoing edge) of the initial node as a first reference edge; performing recursion on the first reference edge within a preset recursion depth, to obtain recursion edges of the first reference edge; and determining the recursion edge as a second reference edge when an output label of the recursion edge is not a preset symbol.

The initial node may be flexibly configured as required. For example, in this embodiment, the first node in the first state diagram is a start node, the second node is a second-order state node, and the third node is a first-order node. The third node of the first state diagram may be used as the initial node. Alternatively, the first node or the second may also be used as the initial node.

The recursion depth may be configured according to an order of a language model. For example, the speech recognition apparatus obtains the order of the key language model as the recursion depth. In this embodiment, for example, the order of the key language model is third-order, and therefore, the speech recognition apparatus sets the recursion depth to 3.

The speech recognition model uses the output edge of the initial node as the first reference edge, to search for the same edge in the second state diagram.

Then, the speech recognition model continues to search, according to the recursion depth, the first state diagram for an edge that can be used as a reference edge. Specifically, using any first reference edge as an example, the speech recognition model performs recursion on the first reference edge within a preset recursion depth, to obtain recursion edges of the first reference edge. If an output label of the recursion edge is not a preset symbol, the recursion edge is determined as a second reference edge.

The preset symbol includes a preset statement terminator and back symbol.

For example, if the recursion depth is three, the speech recognition model uses an output edge of an end node of the first reference edge and an output edge of the output edge as recursion edges within the third order, and there are four nodes in total.

After the recursion edges are obtained, the speech recognition model detects whether the output label of the recursion edge is a preset symbol. If the output label of the recursion edge is not a preset statement terminator or back symbol, the recursion edge is determined as the second reference edge, and an edge that is the same as the second reference edge needs to be searched for in the second state diagram. If the output label of the recursion edge is a preset statement terminator or back symbol, the recursion edge is determined as a non-reference edge, and it is unnecessary to search the second state diagram for an edge that is the same as the non-reference edge. That is, the non-reference edge may be ignored.

In some implementations, using any output edge of the initial node as an example, if an output label of the output edge is a preset back symbol, this output edge may be ignored. The output edge may be considered as a first reference edge whose weight does not need to be enhanced, and a weight of a first target edge that is in the second state diagram (i.e., the same or the corresponding edge to the first reference edge) may not need to be updated. Then, the speech recognition apparatus obtains output edges of the first reference edge, and uses, among the output edges of the first reference edge, an output edge whose output label is not a preset symbol as the output edge of the initial node, that is, the second reference edge. The second reference edge may be used for updating a weight of a second target edge that is in the second state diagram and that is the same as the second reference edge.

After the reference edge is obtained, the speech recognition apparatus traverses the second state diagram to search for a target edge that is the same as the reference edge. As described above, the reference edge may include first reference edge and second reference edge. Correspondingly, the target edge may include first target edge and second target edge.

For example, the step of "searching the second state diagram for an edge having the same label as the reference edge, to serve as a target edge" may include: searching the second state diagram for an edge having the same label as the first reference edge, to serve as a first target edge; and searching recursion edges of the first target edge for an edge having the same label as the second reference edge, to obtain a second target edge.

Using any first reference edge as an example, the speech recognition apparatus searches the second state diagram for an edge having the same label as the first reference edge. The same label may refer to the same input label and/or the same output label. In some embodiments, an input label and an output label of the same edge in the state diagram may or may not be the same. Therefore, the speech recognition apparatus may search for an edge having the same input label as the first reference edge, or search for an edge having the same output label as the first reference edge, or search for an edge having the same input label and the same output label as the first reference edge.

The speech recognition apparatus determines the edge, which has the same label as the first reference edge, as the first target edge that is the same as the first reference edge.

Then, the speech recognition apparatus searches, according to the preset recursion depth, the recursion edges of the first target edge for an edge having the same label as the second reference edge, to obtain the second target edge. The same label may refer to the same input label and/or the same output label.

Therefore, the speech recognition apparatus separately finds a first target edge that is the same as each first reference edge, and a second target edge that is the same as each second reference edge.

103: Obtain a weight of the reference edge, and update a weight of the target edge according to the weight of the reference edge.

The first state diagram records the weight of the reference edge, and the second state diagram records an initial weight of the target edge.

Using any reference edge as an example, the speech recognition apparatus may replace a weight of a target edge that is the same as the reference edge with a weight of the reference edge, to update the weight of the target edge. The reference edge may include first reference edge and second reference edge. Correspondingly, the target edge may include first target edge and second target edge.

In some embodiments, the step of "updating a weight of the target edge according to the weight of the reference edge" may include: obtaining a preset interpolation parameter and an initial weight of the target edge; calculating a target weight of the target edge according to the weight of the reference edge, the interpolation parameter, and the initial weight of the target edge; and replacing the initial weight of the target edge in the second state diagram with the target weight.

The preset interpolation parameter may be flexibly configured according to an actual requirement.

The speech recognition apparatus obtains the initial weight of the target edge that is the same as the reference edge according to the second state diagram. Then, the speech recognition apparatus may calculate the target weight of the target edge according to the following formula.

$$w_{new} = \log(e^{w_{old}} \times (1-\text{lambda}) + e^{w_k} \times \text{lambda});$$

$w_{new}$ is the target weight of the target edge, $w_{old}$ is the initial weight of the target edge, $w_k$ is the weight of the reference edge, and lambda is an interpolation coefficient.

Then, the speech recognition apparatus replaces the initial weight of the target edge in the second state diagram with the target weight of the target edge.

If there are a plurality of reference edges, the speech recognition apparatus separately updates weights of target edges that are the same as the reference edges.

104: set an incentive weight of an edge in the language recognition model corresponding to the target edge in the second state diagram to the updated weight of the target edge in the second state diagram, the language recognition model being a language model obtained after the basic language model is pruned.

The language recognition model is a language model obtained after the basic language model is pruned. The speech recognition apparatus may prune the basic language model, to obtain the language recognition model. For example, entropy-based pruning or rank-based pruning is used to remove unimportant branch paths in the large language model, to implement a maximum similarity between the language recognition model obtained after the pruning and the basic language recognition model that has not been pruned, thereby compressing a data volume of the model and reducing the impact on path probabilities.

After the weight of the target edge in the second state diagram is updated, the speech recognition apparatus configures the updated weight of the target edge in the second state diagram as the incentive weight of the corresponding edge in the language recognition model, that is, configures the updated weight of the target edge in the second state diagram as the incentive weight of the same edge in the language recognition model. The language recognition model is obtained by pruning the basic language model. Therefore, all the edges in the language recognition model exist in the state diagram of the basic language model. In the language recognition model, the incentive weight of the edge has higher priority than the initial weight of the edge.

For example, the speech recognition apparatus establishes a mapping relationship between the target edge in the second state diagram and the corresponding edge in the language recognition model, to configure the target weight of the target edge as the incentive weight of the corresponding edge in the language recognition model.

In this embodiment, a score of a word sequence path may be calculated by using the incentive weight without modifying the weight of the edge in the language recognition model.

In different application scenarios, textual segments to be enhanced may be different. Therefore, different key language models may be trained to adapt to different application scenarios. The incentive weight of the corresponding edge in the language recognition model is configured according to the obtained first state diagram, so that other edges in the language recognition model are not affected. After speech recognition is completed, the mapping relationship of the current incentive weight may be removed according to a release instruction inputted by the user or an application scenario to be switched to, to clear the enhanced weight of the textual segment, thereby eliminating impact of the current textual segment on the language recognition model. An incentive weight in the language recognition model is reconfigured according to a requirement of the next scenario, thereby improving the accuracy of speech recognition.

Therefore, in this embodiment, instead of being configured through direct assignment, the incentive weight is configured by using the mapping relationship, thereby improving the universality and versatility of the language recognition model and the speech recognition model. This solution has high applicability and is applicable to various scenarios. The enhancement of a textual segment does not affect subsequent use in other scenarios, thereby reducing maintenance costs. The accuracy of speech recognition can be effectively improved in different speech recognition scenarios or modes, thereby avoiding cross influence.

105: Input a to-be-recognized speech into a preset speech recognition model, to obtain word sequence paths as the output, the speech recognition model including the language recognition model.

The speech recognition apparatus may obtain the to-be-recognized speech. In some embodiments, the to-be-recognized speech may be a speech acquired by the terminal. For example, the terminal may acquire the to-be-recognized speech in real time, and provide the to-be-recognized speech to the server. In some other embodiments, the to-be-recognized speech may be speech data read from a local or remote storage device.

Step 105 may be performed simultaneously with step 101. Speech recognition may be performed while the weight of the textual segment in the language recognition model is enhanced, to implement online speech recognition. Step 105 may alternatively be performed after step 104. The word paths are screened by using the language recognition model in which the weight of the textual segment has been enhanced, to implement offline speech recognition.

The preset speech recognition model may be an HCLG model. H represents a WFST constructed based on a hidden Markov model (HMM), and can map a state number of the HMM to be a triphone. C represents a context WFST constructed by expanding a monophone to be a triphone. L represents a WFST constructed based on a pronunciation dictionary, and can convert an input phoneme into a word. G represents a WFST constructed based on a language recognition model, and is used for representing a probability relationship of a context of a word.

The speech recognition apparatus inputs the to-be-recognized speech into the speech recognition model, inputs word elements into the language recognition model WFST after steps such as phoneme recognition and phoneme-to-word conversion, to obtain word sequence paths outputted by the language recognition model WFST, and then calculates scores of the word sequence paths.

In some implementations, a word sequence path may be formed by edges of the word sequence path in the Hidden Markov model (HMM) WFST, the context WFST, the pronunciation dictionary WFST, and the language recognition model WFST.

106: Select a target path from the word sequence paths according to the incentive weight of the edge in the language recognition model, to obtain a speech recognition result.

The speech recognition apparatus may calculate the score of each word sequence path.

Specifically, the score of each word sequence is calculated according to weights of edges in the word sequence path.

Using any word sequence as an example, the speech recognition apparatus obtains edges in the path of the word sequence. A path includes edges in the HMM WFST, the context WFST, the pronunciation dictionary WFST, and the language recognition model WFST.

Then, the speech recognition apparatus obtains weights of the edges of the word sequence path in the HMM WFST, the context WFST, the pronunciation dictionary WFST, and the language recognition model WFST. In addition, the speech recognition apparatus detects whether the edge of the word sequence path in the language recognition model WFST has an incentive weight.

Descriptions are provided by using any edge of the word sequence path in the language recognition model WFST as an example. If the edge has an incentive weight, an initial weight of the edge is replaced with the incentive weight, to calculate the score of the path. If the edge has no incentive weight, the initial weight of the edge is used to calculate the score of the path.

Therefore, the speech recognition apparatus calculates the score of a word sequence path through summation or multiplication according to the weights of the edges in the word sequence path.

Then, the speech recognition apparatus forms a word sequence according to a word sequence path having a highest score, to obtain a text corresponding to the to-be-recognized speech, that is, a recognition result.

It can be learned from the above that, in this embodiment of this disclosure, a preset first state diagram and a preset second state diagram are loaded, the first state diagram being a state diagram of a key language model, the second state diagram being a state diagram of a large language model; a reference edge is extracted from the first state diagram, and an edge having the same label as the reference edge is searched for in the second state diagram, to serve as a target edge; a weight of the reference edge is obtained, and a weight of the target edge is updated according to the weight of the reference edge; the updated weight of the target edge in the second state diagram is configured as an incentive weight of a corresponding edge in a language recognition model, the language recognition model being a language model obtained after the large language model is pruned; a to-be-recognized speech is inputted into a preset speech recognition model, to obtain word sequence paths outputted by the speech recognition model, the speech recognition model including the language recognition model; and a target path is selected from the word sequence paths according to the incentive weight of the edge in the language recognition model, to obtain a speech recognition result. A corpus of the key language model is much smaller than a corpus of the large language model. Therefore, a weight of a textual segment edge in the first state diagram is greater than a weight of the same target edge in the second state diagram. In this solution, a weight of a target edge in the first state diagram is used to enhance a weight of the same target edge in the second state diagram, to stimulate a weight of the target edge in the speech recognition model, so that during speech recognition, a weight of an edge in a path that includes a textual segment in the language recognition model is improved, thereby improving a probability that the path including the textual segment is used as a recognition result. Therefore, this solution improves a probability of occurrence of a textual segment in a speech recognition result, thereby ensuring the speech recognition speed and improving the accuracy of the speech recognition result. In addition, this solution is applicable to various scenarios, and textual segments in various scenarios may be used to improve the accuracy of a speech recognition result.

Figure 2:
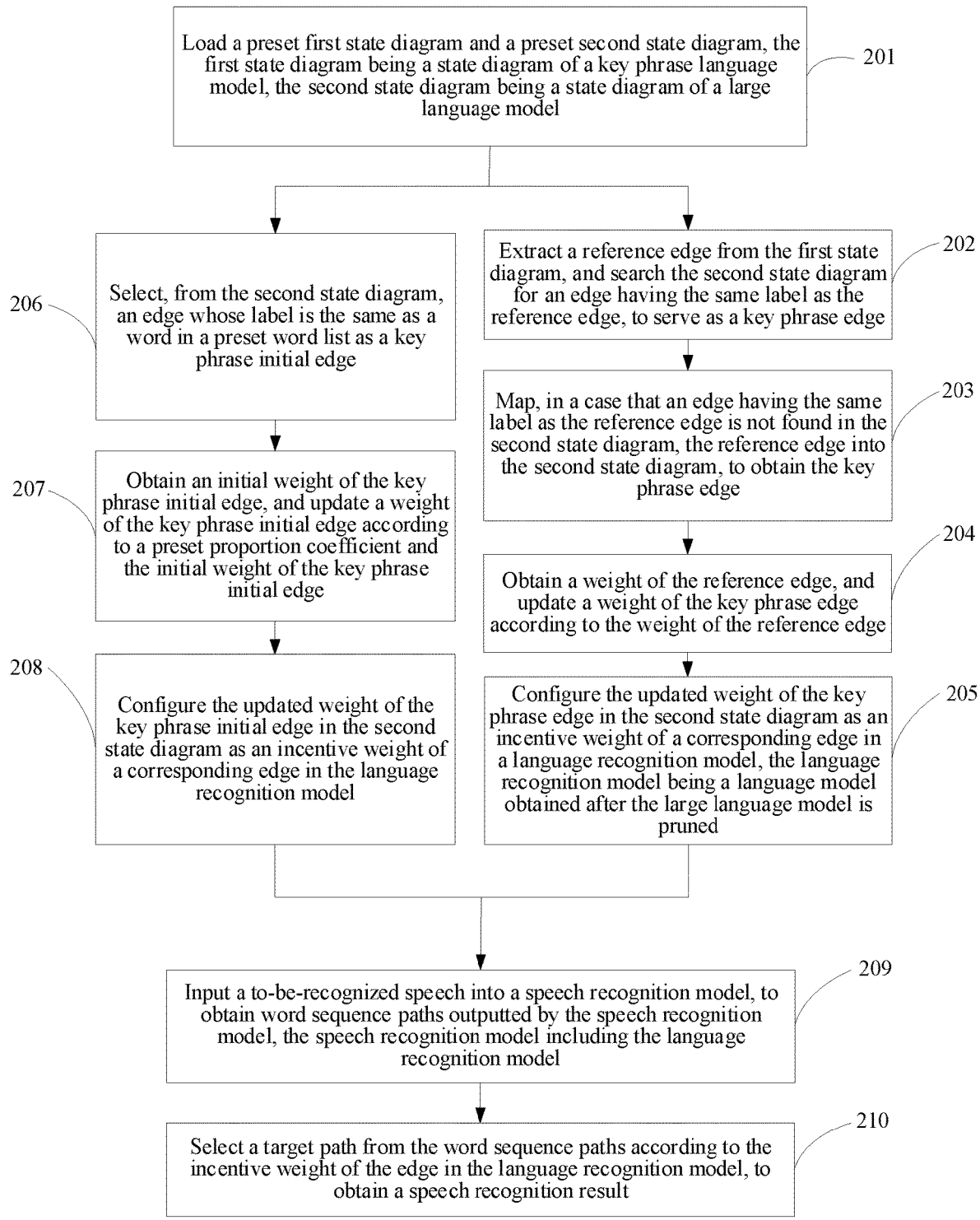
FIG. 2 is a schematic flowchart of another speech recognition method according to an embodiment of this disclosure.

As described above, the method of adjusting a weight of an edge in the second state diagram in step 21 may be adding a corresponding edge in the second state diagram and setting a weight of the corresponding edge. The method may be used independently from the method shown in FIG. 1c, or may be used simultaneously with the method shown in FIG. 1c. FIG. 2 shows a speech recognition method according to an embodiment of this disclosure. The method may include the following steps.

201: Load a preset first state diagram and a preset second state diagram, the first state diagram being a state diagram of a key language model, the second state diagram being a state diagram of a basic language model.

For a specific implementation, reference may be made to the description of step 101 in the foregoing embodiment of the speech recognition method. Details are not described herein again.

202: Extract a reference edge from the first state diagram, and search the second state diagram for an edge having the same label as the reference edge, to serve as a target edge.

For a specific implementation, reference may be made to the description of step 102 in the foregoing embodiment of the speech recognition method. Details are not described herein again.

203: Map, when an edge having the same label as the reference edge is not found in the second state diagram, the reference edge into the second state diagram, to obtain the target edge.

For example, if in the second state diagram, the server does not find an edge having the same label as a first reference edge, the server searches for a sequence number of an initial node of the first reference edge in the first state diagram. Then, the server finds, in the second state diagram, a node corresponding to the sequence number, and establishes a virtual edge that is the same as the first reference edge by using the node as an initial node, to use the virtual edge as a first target edge, thereby implementing mapping of the first reference edge. This mapping process may also be considered as adding a virtual edge as the first target edge.

Similarly, if the server does not find, in recursion edges of the first target edge, an edge having the same label as a second reference edge, the server establishes a virtual edge having the same label as the second reference edge by using an end node of the first target edge as an initial node, to use the virtual edge as a second target edge, thereby implementing mapping of the second reference edge.

Initial weights of the first target edge and the second target edge that are obtained through mapping may be preset values.

204: Obtain a weight of the reference edge, and update a weight of the target edge according to the weight of the reference edge.

For a specific implementation, reference may be made to the description of step 103 in the foregoing embodiment of the speech recognition method. Details are not described herein again.

205: Configure the updated weight of the target edge in the second state diagram as an incentive weight of a corresponding edge in a language recognition model, the language recognition model being a language model obtained after a large language model is pruned.

For a specific implementation, reference may be made to the description of step 104 in the foregoing embodiment of the speech recognition method. Details are not described herein again.

206: Select, from the second state diagram, an edge whose label is the same as a word in a preset word list as an initial edge.

The preset word list records the first word obtained after word segmentation is performed on the textual segment.

Before step 206, the method may further include: performing word segmentation on the textual segment, and adding the first word obtained through word segmentation into the preset word list.

There may be one or more preset textual segments. The server performs word segmentation on the textual segments separately, and adds the first words of the textual segments that are obtained through word segmentation into the word list.

During speech recognition, to improve a probability of entering or finding a textual segment path, the server selects an edge whose label is the same as a word in the preset word list as the initial edge.

207: Obtain an initial weight of the initial edge, and update a weight of the initial edge according to a preset scale factor and the initial weight of the initial edge.

For example, the server may calculate a target weight of the initial edge by using the following formula:

$$w_{new} = w_{old} \times (1-l);$$

$w_{new}$ is the target weight of the initial edge, $w_{old}$ is the initial weight of the initial edge, and l is the preset scale factor.

Then, the server replaces the initial weight of the initial edge with the target weight of the initial edge, to update the weight of the initial edge.

Therefore, the server enhances the weight of the initial edge in the second state diagram.

208: Configure the updated weight of the initial edge in the second state diagram as an incentive weight of a corresponding edge in the language recognition model.

After the initial edge and the updated weight of the initial edge are obtained, the server searches the language recognition model for an edge having the same label as the initial edge and establishes a mapping relationship, and then configures the target weight of the key phrase initial edge as the incentive weight of the corresponding edge in the language recognition model.

209: Input a to-be-recognized speech into a preset speech recognition model, to obtain word sequence paths outputted by the speech recognition model, the speech recognition model including the language recognition model.

For a specific implementation, reference may be made to the description of step 105 in the foregoing embodiment of the speech recognition method. Details are not described herein again.

When the speech recognition model is traversed or searched for a word sequence path, if an edge whose label is a specific word is not found, the edge whose label is the specific word may be searched for in mapped target edges in the large language model, to find an edge in the word sequence as the target edge, and a target weight of the target edge is obtained to calculate a score of the word sequence path.

210: Select a target path from the word sequence paths according to the incentive weight of the edge in the language recognition model, to obtain a speech recognition result.

For a specific implementation, reference may be made to the description of step 106 in the foregoing embodiment of the speech recognition method. Details are not described herein again.

It can be learned from the above that, in this application, a weight of a textual segment path in the language recognition model is enhanced by using a weight of the textual segment path in the key language model, to improve the probability of occurrence of the textual segment in a recognition result, thereby improving the accuracy of the speech recognition result. When an edge having the same label as the reference edge is not found in the second state diagram, a target edge is added to the second state diagram in a mapping manner, so that during speech recognition, the mapped target edge may be used, thereby improving a probability of occurrence of the textual segment in the recognition result. In addition, by enhancing the weight of the initial edge, the context is enhanced, so that during language recognition, a probability of finding the textual segment, that is, a probability that the word sequence enters the textual segment path, is improved. Therefore, in this embodiment, the accuracy of speech recognition is improved in a plurality of aspects.

According to the method described in the foregoing embodiments, the following further provides detailed descriptions by using examples.

Figure 3A:
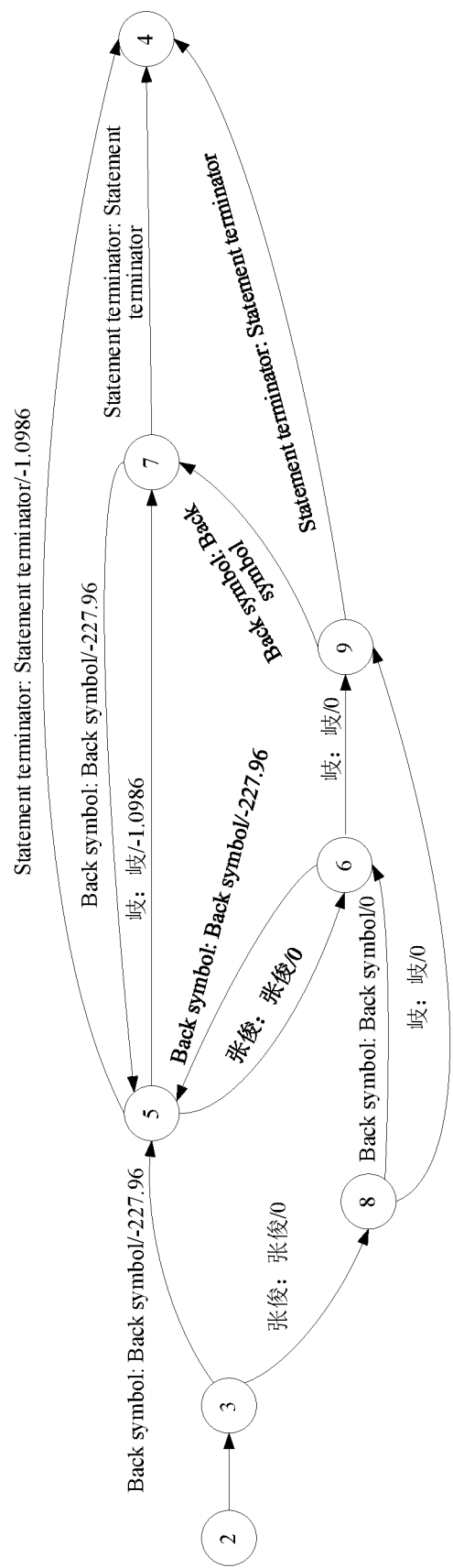
FIG. 3a is a schematic diagram of a first state diagram according to an embodiment of this disclosure.
Figure 3B:
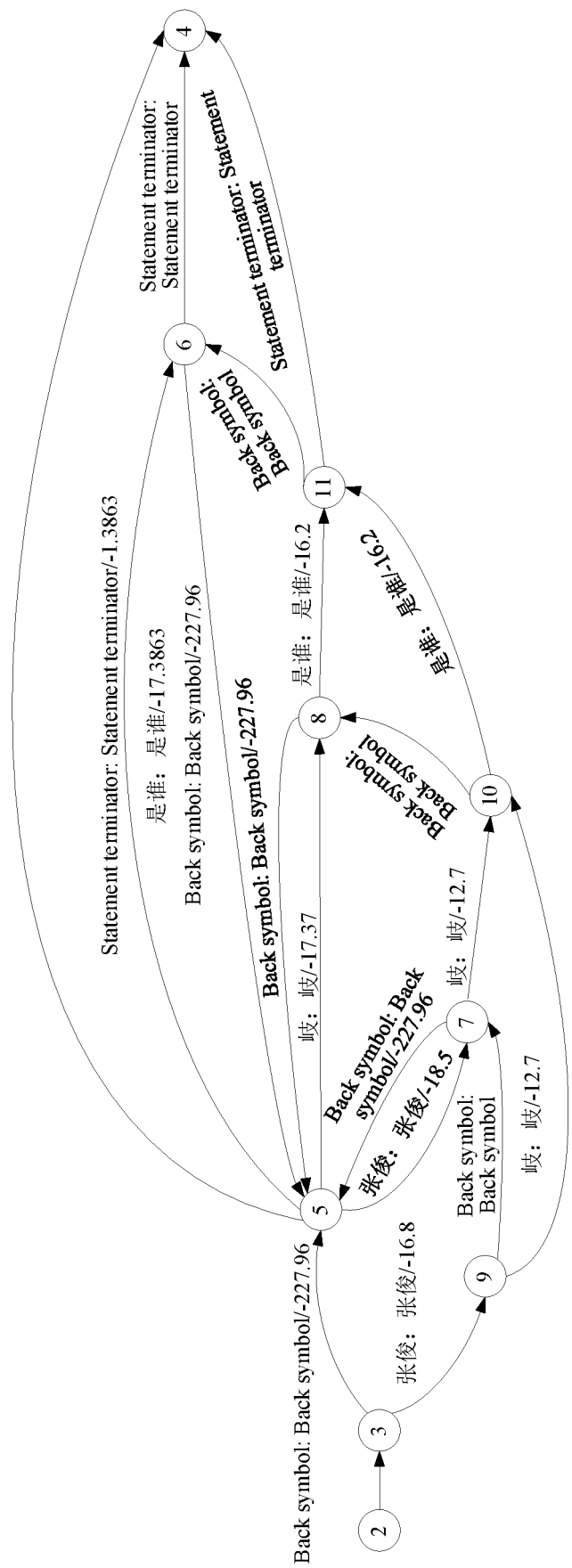
FIG. 3b is a schematic diagram of a second state diagram according to an embodiment of this disclosure.

For example, referring to FIG. 3*a* and FIG. 3*b*, in this embodiment, descriptions are provided by using an example in which the speech recognition apparatus is specifically integrated in a decoder.

(1) Acquire a to-be-Recognized Speech in Real Time.

The decoder obtains a to-be-recognized speech acquired in real time by a speech acquisition apparatus, and performs online speech recognition.

(2) Input the to-be-Recognized Speech into a Speech Recognition Model.

The decoder inputs the to-be-recognized speech into a speech recognition model, and inputs word elements into a language recognition model after steps such as phoneme recognition and phoneme-to-a word conversion.

(3) Obtain and Load a First State Diagram and a Second State Diagram.

Before or when the lemma is inputted into the language recognition model, the server loads a first state diagram and a second state diagram, to enhance a weight of a target edge.

For example, the decoder obtains a preset textual segment, trains a key language model according to the textual segment, constructs a weighted finite-state transducer of the key language model, and obtains a state diagram indicated by the weighted finite-state transducer of the key language model as the first state diagram. In this embodiment, descriptions are provided by using an example in which the key language model is a third-order tri-gram.

For example, the textual segment is "张俊岐", and reference may be made to FIG. 3*a* for the first state diagram obtained by the decoder. The node 2 is in a second-order state, and the node 3 is an initial node of the first state diagram. The nodes are connected by connection lines, to form edges. An arrow direction of an edge indicates a connection relationship, and may be understood as a path direction. An input label, an output label, and a weight of an edge are sequentially recorded on the edge. In this embodiment, descriptions are provided by using an example in which the weight of the edge is a logarithm value of a probability of the edge. In some implementations, a preset statement terminator may be the symbol "</s>", and a preset back symbol may be the symbol "#phi".

In addition, the decoder obtains a preset general corpus, trains a large language model according to the general corpus, constructs a weighted finite-state transducer of the large language model, and obtains a state diagram indicated by the weighted finite-state transducer of the large language model as the second state diagram. In this embodiment, descriptions are provided by using an example in which the large language model is a second-order bi-gram.

Reference may be made to FIG. 3*b* for the second state diagram obtained by the decoder. The node 2 is in a second-order state, and the node 3 is an initial node of the first state diagram. The nodes are connected by connection lines, to form edges. An arrow direction of an edge indicates a connection relationship, and may be understood as a path direction. An input label, an output label, and a weight of an edge are sequentially recorded on the edge. In this embodiment, descriptions are provided by using an example in which the weight of the edge is a logarithm value of a probability of the edge. A preset statement terminator may be the symbol "</s>", and a preset back symbol may be the symbol "#phi".

(4) Enhance a Weight of a Target Edge in the Second State Diagram According to the First State Diagram.

The decoder extracts a reference edge from the first state diagram, and searches the second state diagram for an edge having the same label as the reference edge, to serve as a target edge, obtains a weight of the reference edge, and updates a weight of the target edge according to the weight of the reference edge.

For example, in the first state diagram and the second state diagram, same paths starting from the node 2 are selected. In the first state diagram, an edge from the node 3 to the node 8 is used as a first reference edge 3-8 with a label "张俊". In the second state diagram, the label of the edge from the node 3 to the node 9 is also "张俊". Therefore, a first target edge 3-9 having the same label as the first reference edge 3-8 is obtained. Then, a weight 0 of the first reference edge and an initial weight −16.8 of the first target edge are obtained. According to the formula in the foregoing embodiment: $\log(e^{-16.8} \times 0.9 + e^0 \times 0.1) = -2.3$, it is obtained through calculation that a target weight of the first target edge 3-9 is −2.3, which is enhanced compared with −16.8, that is, a probability of the edge 3-9 is enhanced.

Then, the decoder performs recursion on the first reference edge in the first state diagram. Because the key language model is a third-order model, the recursion depth is 3, and a second reference edge 8-9 with a label "岐" is obtained. In addition, the decoder finds an edge 9-10 with the label "岐" in output edges of the first target edge 3-9, to serve as a second target edge. The decoder obtains, through calculation, that a target weight of the second target edge 9-10 is −2.3 according to a weight 0 of the second reference edge 8-9 and an initial weight −12.7 of the second target edge 9-10, enhancing the weight of the second target edge. In the first state diagram, output labels of two edges of the node 9 are a back symbol and a statement terminator, respectively. Therefore, the two edges cannot be used as reference edges to enhance the weight of the edge in the second state diagram.

In addition, the decoder ignores an edge 3-5 whose label is a back symbol in the first state diagram and the second state diagram, and performs recursion on the edge, to obtain second reference edges 5-6 and 5-7 at the node 5 of the first state diagram. In the second state diagram, a second target edge 5-7 has the same label "张俊" as the first reference edge 5-6, and a second target edge 5-8 has the same label "岐" as the first reference edge 5-7. Therefore, it may be obtained through calculation that a target weight of the second target edge 5-7 is −3.4 according to a weight −1.0986 of the first reference edge 5-6 and an initial weight −18.5 of the second target edge 5-7. It may be obtained through calculation that a target weight of the second target edge 5-8 is −3.4 according to a weight −1.0986 of the first reference edge 5-7 and an initial weight −17.38 of the second target edge 5-8.

In addition, the decoder finds, according to the recursion depth, a second reference edge 6-9 at the node 6 in the first state diagram, and a second target edge 7-10 that is in the second state diagram and that is the same as the second reference edge 6-9. The decoder may obtain, through calculation, that a target weight of the second target edge 7-10 is −2.3 according to a weight 0 of the first reference edge 6-9 and an initial weight −12.7 of the second target edge 7-10.

Therefore, the weight of the target edge is updated. In the second state diagram, edge weights related to the textual segment in the first state diagram are all improved. Correspondingly, weights of corresponding edges in the language recognition model that is obtained after the large language model is pruned are also improved, so that during decoding, probabilities of occurrence of such words are much higher than before.

Then, the decoder correspondingly configures the weights of the target edges as the incentive weights of the corresponding edges in the language recognition model respectively.

(5) Mapping of the Target Edge.

Figure 3C:
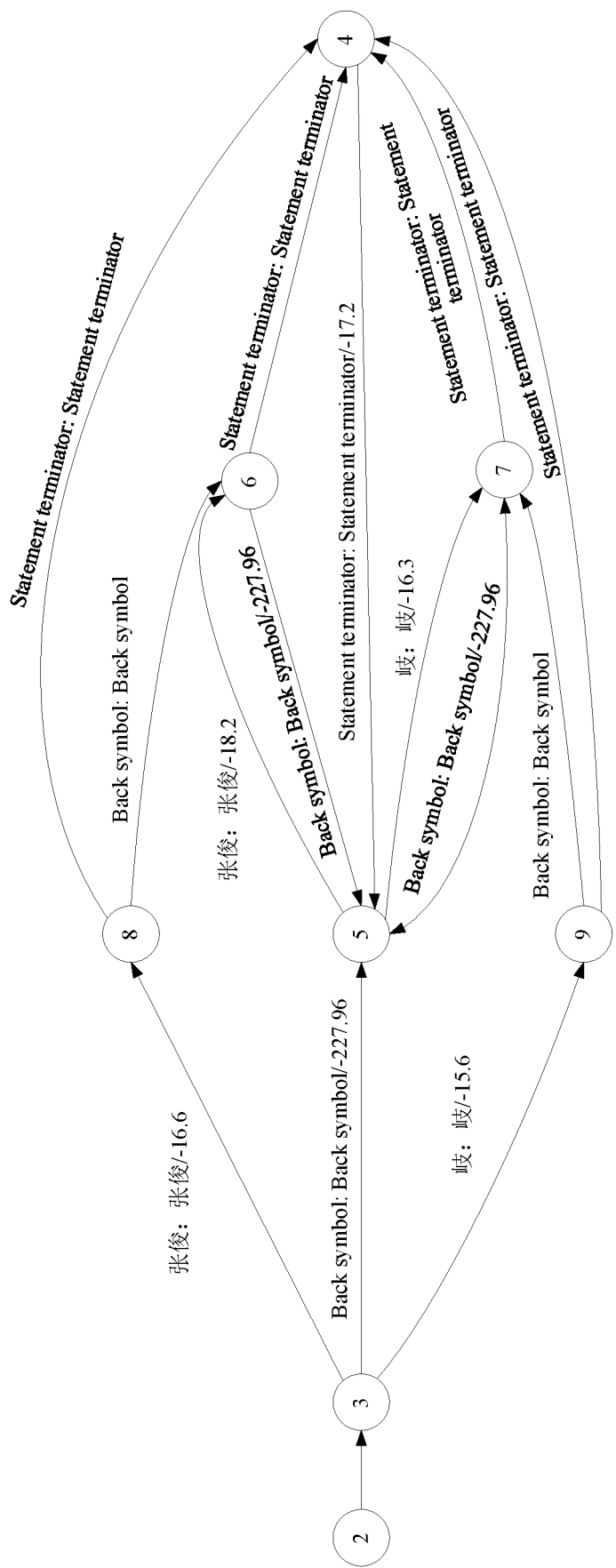
FIG. 3c is a schematic diagram of another second state diagram according to an embodiment of this disclosure.

Referring to FIG. 3c, for example, the first state diagram is FIG. 3a and the second state diagram is FIG. 3c.

A path (张俊, 岐) formed by the nodes 3-8-9 in the first state diagram cannot be found in the second state diagram. To find (张俊, 岐) in the second state diagram, it is necessary to trace back from the node 9 to read "岐", which reduces an enhancing effect of the textual segment.

Therefore, the decoder associates sequence numbers of some nodes in the second state diagram with sequence numbers of some nodes in the first state diagram by using higher-order edges in the first state diagram, to perform edge mapping. In this way, during decoding, if the decoder cannot find an edge whose input label is a specific word in the language recognition model, the score of a word sequence path is improved by using the mapping relationship.

For example, the decoder adds a virtual edge that is the same as the second reference edge 8-9 in the first state diagram to the node 9 in the second state diagram, to serve as a second target edge that is the same as the second reference edge 8-9, to implement mapping of the edge, and updates the weight of the second target edge, to implement weight enhancement.

Therefore, during decoding, if the decoder cannot find the path (张俊, 岐) in the language recognition model, the decoder determines the weight of the path (张俊, 岐) according to the mapped virtual edge.

(6) Context Enhancement of a Textual Segment.

Through weight enhancement and mapping of the target edge in the second state diagram, in this embodiment, a recall rate of a textual segment can be improved to 85% or higher with hardly any impact on a normal recognition result, which satisfies most scenario requirements.

In most cases, a textual segment is segmented into a plurality of smaller-granularity words, for recognition and language training. Therefore, the recall rate of the textual segment may be improved by improving weights of the small-granularity words in the textual segment. Especially, when a user has not configured a context corpus of the textual segment, it is relatively difficult to enter, during speech recognition, a node of the first word segmented from the textual segment. Therefore, in this embodiment, a probability of entering, from the node of the context word of the textual segment, the first word segmented from the textual segment is enhanced.

Specifically, the decoder performs word segmentation on the textual segment, and configures the first word obtained through word segmentation into the preset word list. Then, an edge whose label is the same as the word in the preset word list is selected from the second state diagram as an initial edge; an initial weight of the initial edge is obtained, and a weight of the initial edge is updated according to a preset scale factor and the initial weight of the initial edge; and the updated weight of the initial edge in the second state diagram is configured as an incentive weight of a corresponding edge in the language recognition model.

(7) Obtain Word Sequence Paths Outputted by the Speech Recognition Model, and Calculate Scores of the Word Sequence Paths, to Obtain a Recognition Result.

The decoder inputs word elements into a WFST constructed based on the language recognition model, to obtain word sequence paths outputted by the language recognition model WFST. Then, the decoder calculates the scores of the word sequence paths according to weights of edges of the word sequence paths in the language recognition model, and uses a word sequence path having a highest score as a recognition result for output.

It can be learned from the above that, in this embodiment of this disclosure, a user can quickly configure a textual segment in a scenario such as a conference, thereby enhancing an occurrence probability of the textual segment in a recognition result, and improving the accuracy of speech recognition. In this embodiment, an operation procedure is shortened, thereby saving a lot of time. In addition, a real-time rate of a decoder is not affected, and an advantage of low latency is achieved.

In some embodiments, the steps of the speech recognition method may be performed by a plurality of physical devices, to jointly implement the method. The foregoing speech recognition apparatus may be jointly implemented by a plurality of physical devices.

For example, the plurality of physical devices may be a plurality of servers. Some servers mainly provide a speech recognition service to a user, and some other servers provide a user-customized speech recognition model to the servers.

In another example, the plurality of physical devices may be terminal devices and servers. The terminal devices provide a speech recognition service to the user, and the servers provide a user-customized speech recognition model to the terminal devices.

Figure 3D:
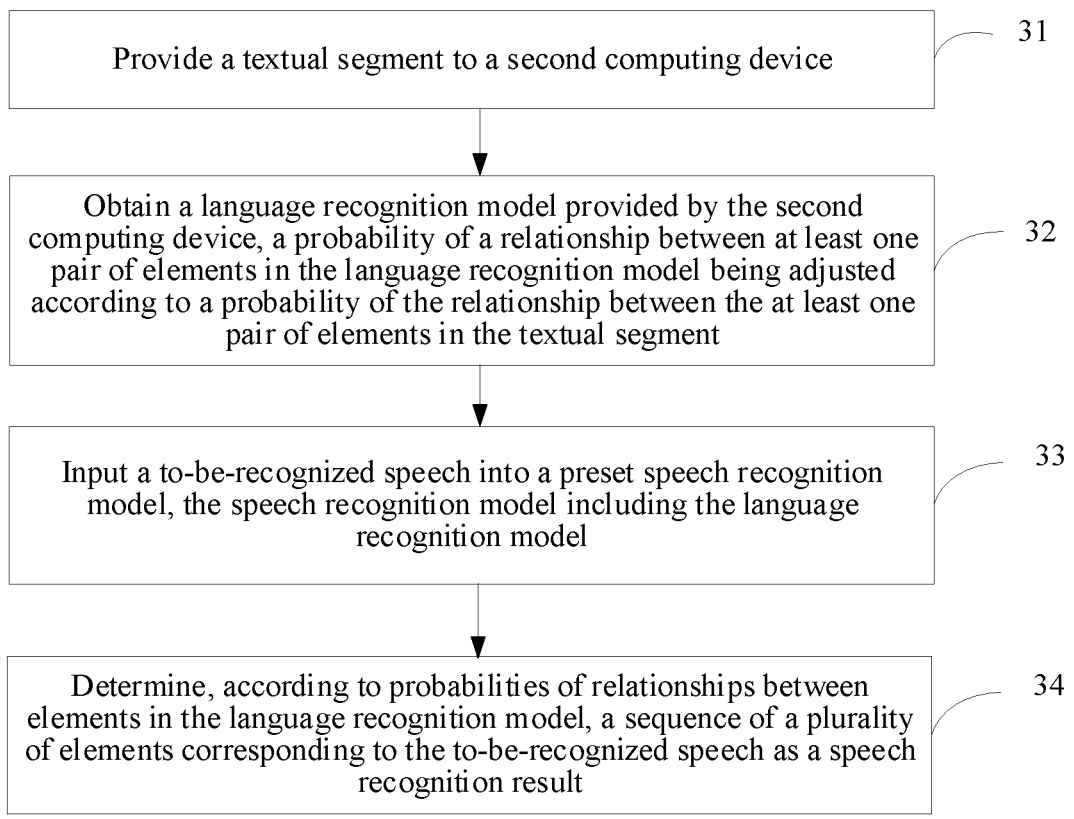
FIG. 3d is a schematic flowchart of a speech recognition method according to an embodiment of this disclosure.

In this case, a speech recognition method in the embodiments may be as shown in FIG. 3d. The method may be performed by a computing device, for example, a server or a terminal device. As shown in FIG. 3d, the method may include the following steps.

Step 31: Provide a textual segment to a second computing device.

The computing device may receive, through a user interface, one or more textual segments that are inputted or selected by a user, for example, terms and proper nouns, and then provide the textual segment to the second computing device, so that the second computing device provides a "customized" speech recognition model according to the textual segment.

Step 32: Obtain a language recognition model provided by the second computing device, a probability of a relationship between at least one pair of elements in the language recognition model being adjusted by using a probability of the relationship between the at least one pair of elements in the textual segment.

The second computing device may perform related steps of adjusting the language recognition model in the foregoing method, for example, steps 11, 21 and 22, 101 to 104, and 201 to 208, and provide the obtained speech recognition model to a computing device that provides the textual segment.

Step 33: Input a to-be-recognized speech into a preset speech recognition model, the speech recognition model including the language recognition model.

Step 34: Determine, according to probabilities of relationships between elements in the language recognition model, a sequence of a plurality of elements corresponding to the to-be-recognized speech as a speech recognition result.

Figure 4A:
FIG. 4a is a schematic structural diagram of a speech recognition apparatus according to an embodiment of this disclosure.

An embodiment of this disclosure further provides a speech recognition apparatus. FIG. 4a is a schematic structural diagram of a speech recognition apparatus according to an embodiment of this disclosure. As shown in FIG. 4a, the speech recognition apparatus may include an adjustment module 41 and a speech recognition module 42.

The adjustment module 41 may adjust a probability of a relationship between at least one pair of elements in a language recognition model according to a probability of the relationship between the at least one pair of elements in a textual segment.

The speech recognition module 42 may input a to-be-recognized speech into a preset speech recognition model, the speech recognition model including the language recognition model; and determine, according to probabilities of relationships between elements in the language recognition model, a sequence of a plurality of elements corresponding to the to-be-recognized speech as a speech recognition result.

In some embodiments, the speech recognition apparatus may be integrated in a network device such as a server. In some embodiments, the speech recognition apparatus may be integrated in a terminal device. In some other embodiments, the speech recognition apparatus may be jointly implemented by components distributed in a plurality of physical devices. For example, the adjustment module 41 may be implemented by a first computing device, and the speech recognition module 42 may be implemented by a second computing device. The computing device may be any device with a computing capability, for example, a server or a terminal.

Figure 4B:
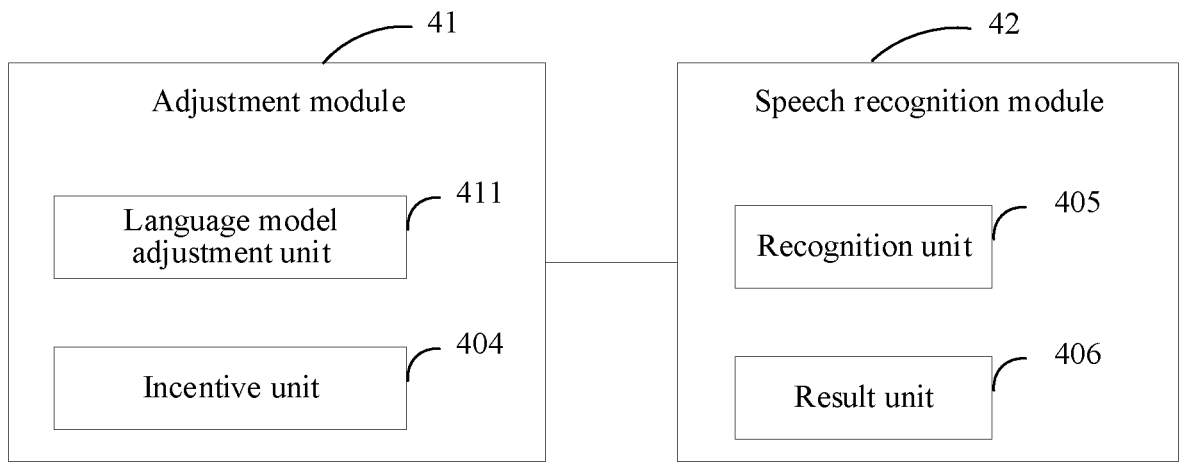
FIG. 4b is a schematic structural diagram of a speech recognition apparatus according to an embodiment of this disclosure.

FIG. 4b is a schematic structural diagram of a speech recognition apparatus according to an embodiment of this disclosure. As shown in FIG. 4b, the adjustment module 41 may include a language model adjustment unit 411 and an incentive unit 404.

The language model adjustment unit 411 may adjust, by using a weight of an edge that represents a relationship between a pair of elements in a first state diagram corresponding to the textual segment, a weight of an edge that is in a preset second state diagram and that corresponds to the edge in the first state diagram, the first state diagram being a state diagram of a language model of the textual segment, the second state diagram being a state diagram of a basic language model.

The incentive unit 404 may configure a weight of at least one edge in the modified second state diagram as an incentive weight of a corresponding edge in the language recognition model, the language recognition model being a language model obtained after the basic language model is pruned.

In this case, the speech recognition module 42 may include a recognition unit 405 and a result unit 406.

The recognition unit 405 may input the to-be-recognized speech into the preset speech recognition model, to obtain word sequence paths outputted by the speech recognition model, the speech recognition model including the language recognition model.

The result unit 406 may select a target path from the word sequence paths according to the incentive weight of the edge in the language recognition model, to obtain the speech recognition result.

In some embodiments, the language model adjustment unit 411 may include an update unit, configured to search the second state diagram for an edge having the same label as the edge, to serve as a target edge; and increase a weight of the target edge according to the weight of the edge.

In some embodiments, the language model adjustment unit 411 may include a mapping unit, configured to add an edge corresponding to the edge in the first state diagram as a target edge in the second state diagram; and set a weight of the target edge according to the weight of the edge.

Figure 4C:
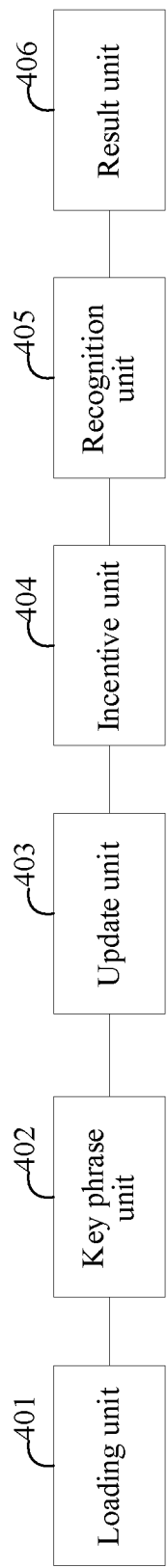
FIG. 4c is a schematic structural diagram of a speech recognition apparatus according to an embodiment of this disclosure.

FIG. 4c is a schematic structural diagram of a speech recognition apparatus according to an embodiment of this disclosure. As shown in FIG. 4c, the speech recognition apparatus may include a loading unit 401, a key phrase unit 402, an update unit 403, an incentive unit 404, a recognition unit 405, and a result unit 406.

(1) Loading Unit 401

The loading unit 401 is configured to load a preset first state diagram and a second state diagram, the first state diagram being a state diagram of a key language model, the second state diagram being a state diagram of a large language model.

The first state diagram is a directed state diagram of the key language model, and records directed connection relationships between nodes, to describe possible states of a textual segment object in the key language model and transfer paths of the states.

The key language model may be a language model constructed according to a preset textual segment, for example, an n-gram (n-gram language model). In this embodiment, descriptions are provided by using an example in which n is 3, and the key language model is a third-order tri-gram (tri-gram language model). That is, occurrence of the third word in the key language model is only related to the previous two words, and is not related to any other words.

The second state diagram is a weighted directed state diagram of the large language model. The large language model may be a large-scale language model that is rich in corpus information and that has not been pruned.

Due to different language models, weights of edges with the same label in the first state diagram and the second state diagram may be different.

In some embodiments, the loading unit 401 may be specifically configured to obtain a preset textual segment, train the key language model according to the textual segment, construct a weighted finite-state transducer of the key language model, and obtain a state diagram indicated by the weighted finite-state transducer of the key language model as the first state diagram.

The preset textual segment may be a related corpus in the field of the to-be-recognized speech, and may specifically be configured as required flexibly. There may be one or more preset textual segments.

The weighted finite-state transducer may be referred to as WFST for short in this embodiment. The WFST can recognize an entire path from an initial state to an end state of a word, where a state of a word may be understood as a node. The nodes are connected in sequence to form directed edges. Each edge has a corresponding label and weight. The label includes an input label and an output label, and the input label is the same as the output label. The weight represents a probability that the edge appears in the entire path. The weight may be a probability value, or may be calculated according to a probability value. A probability of the entire path may be calculated according to the weights or probabilities of all the edges in the path.

The loading unit 401 uses the textual segment as a training corpus, and inputs the textual segment into the tri-gram for training, to obtain the key language model. Then, the loading unit 401 constructs the weighted finite-state transducer of the key language model. Therefore, the loading unit 401 may obtain nodes in the WFST of the key language model and connection relationships between the nodes, to obtain the state diagram indicated by the WFST of the key language model, and use the state diagram indicated by the WFST of the key language model as the first state diagram.

In some embodiments, the loading unit 401 may be specifically configured to obtain a preset general corpus, train the large language model according to the general corpus, construct a weighted finite-state transducer of the large language model, and obtain a state diagram indicated by the weighted finite-state transducer of the large language model as the second state diagram.

The general corpus may be a commonly used large-scale corpus.

The loading unit 401 inputs the general corpus into a preset language model, for example, a second-order bi-gram (bi-gram language model), for training, to obtain the large language model. Then, the loading unit 401 constructs the weighted finite-state transducer of the large language model. Therefore, the loading unit 401 may obtain nodes in the WFST of the large language model and connection relationships between the nodes, to obtain the state diagram indicated by the WFST of the large language model, and use the state diagram indicated by the WFST of the large language model as the second state diagram.

A quantity of textual segments in the WFST of the key language model is much smaller than a quantity of corpora in the WFST of the large language model. Therefore, a weight of an edge in the WFST of the key language model is greater than a weight of the same edge in the WFST of the large language model. Therefore, a weight of an edge in the first state diagram is greater than a weight of the same edge in the second state diagram.

The loading unit 401 loads the first state diagram and the second state diagram simultaneously before or during speech recognition.

(2) Key Phrase Unit 402

The key phrase unit 402 is configured to extract a reference edge from the first state diagram, and search the second state diagram for an edge having the same label as the reference edge, to serve as a target edge.

If the reference edge includes a prefix path, an edge having the same prefix path and the same label is the target edge that is the same as the reference edge.

The key phrase unit 402 first extracts the reference edge from the first state diagram. For example, an initial node of the first state diagram may be obtained, and the reference edge is obtained according to a preset traversal depth and the initial node.

In some embodiments, the key phrase unit 402 may be specifically configured to determine an output edge of the initial node as a first reference edge; perform recursion on the first reference edge within a preset recursion depth, to obtain recursion edges of the first reference edge; and determine the recursion edge as a second reference edge when an output label of the recursion edge is not a preset symbol.

The initial node may be flexibly configured as required. For example, in this embodiment, the first node in the first state diagram is a start node, the second node is a second-order state node, and the third node is a first-order node. Therefore, the third node of the first state diagram may be used as the initial node.

The recursion depth may be configured according to an order of a language model. For example, the key phrase unit 402 obtains the order of the key language model as the recursion depth. In this embodiment, for example, the order of the key language model is third-order, and therefore, the speech recognition apparatus sets the recursion depth to 3.

The key phrase unit 402 uses the output edge of the initial node as the first reference edge, to search for the same edge in the second state diagram.

Then, the key phrase unit 402 continues to search, according to the recursion depth, the first state diagram for an edge that can be used as a reference edge. Specifically, using any first reference edge as an example, the key phrase unit 402 performs recursion on the first reference edge within a preset recursion depth, to obtain recursion edges of the first reference edge. If an output label of the recursion edge is not a preset symbol, the recursion edge is determined as a second reference edge.

The preset symbol is a preset statement terminator and back symbol.

For example, if the recursion depth is three, the key phrase unit 402 uses an output edge of an end node of the first reference edge and an output edge of the output edge as recursion edges within the third order, and there are four nodes in total.

After the recursion edges are obtained, the key phrase unit 402 detects whether the output label of the recursion edge is a preset symbol. If the output label of the recursion edge is not a preset statement terminator or back symbol, the recursion edge is determined as the second reference edge, and an edge that is the same as the second reference edge needs to be searched for in the second state diagram. If the output label of the recursion edge is a preset statement terminator or back symbol, the recursion edge is determined as a non-reference edge, and it is unnecessary to search the second state diagram for an edge that is the same as the non-reference edge.

Using any output edge of the initial node as an example, if an output label of the output edge is a preset back symbol, the output edge is ignored. The output edge is used as a first reference edge whose weight does not need to be enhanced, and a weight of a first target edge that is in the second state diagram and that is the same as the first reference edge is not updated. Then, the key phrase unit 402 obtains output edges of the first reference edge, and uses, among the output edges of the first reference edge, an output edge whose output label is not a preset symbol as the output edge of the initial node, that is, the second reference edge. The second reference edge may be used for updating a weight of a second target edge that is in the second state diagram and that is the same as the second reference edge.

After the reference edge is obtained, the key phrase unit 402 traverses the second state diagram to search for a target edge that is the same as the reference edge.

For example, the key phrase unit 402 may be specifically configured to search the second state diagram for an edge having the same label as the first reference edge, to serve as a first target edge; and search recursion edges of the first target edge for an edge having the same label as the second reference edge, to obtain a second target edge.

Using any first reference edge as an example, the key phrase unit 402 searches the second state diagram for an edge having the same label as the first reference edge. The same label may refer to the same input label and/or the same output label. In this embodiment, an input label and an output label of the same edge in the state diagram are the same. Therefore, the key phrase unit 402 may search for an edge having the same input label as the first reference edge, or search for an edge having the same output label as the first reference edge, or search for an edge having the same input label and the same output label as the first reference edge.

The key phrase unit 402 determines the edge, which has the same label as the first reference edge, as the first target edge that is the same as the first reference edge.

Then, the key phrase unit 402 searches, according to the preset recursion depth, the recursion edges of the first target edge for an edge having the same label as the second reference edge, to obtain the second target edge. The same label may refer to the same input label and/or the same output label.

Therefore, the key phrase unit 402 separately finds a first target edge that is the same as each first reference edge, and a second target edge that is the same as each second reference edge.

(3) Update Unit 403

The update unit 403 is configured to obtain a weight of the reference edge, and update a weight of the target edge according to the weight of the reference edge.

The first state diagram records the weight of the reference edge, and the second state diagram records an initial weight of the target edge.

Using any reference edge as an example, the update unit 403 may replace a weight of a target edge that is the same as the reference edge with a weight of the reference edge, to update the weight of the target edge.

In some embodiments, the update unit 403 may be specifically configured to obtain a preset interpolation parameter and an initial weight of the target edge; calculate a target weight of the target edge according to the weight of the reference edge, the interpolation parameter, and the initial weight of the target edge; and replace the initial weight of the target edge in the second state diagram with the target weight.

The preset interpolation parameter may be flexibly configured according to an actual requirement.

The update unit 403 obtains the initial weight of the target edge that is the same as the reference edge according to the second state diagram. Then, the update unit 403 may calculate the target weight of the target edge according to the following formula.

$$w_{new} = \log(e^{w_{old}} \times (1-\text{lambda}) + e^{w_k} \times \text{lambda});$$

$w_{new}$ is the target weight of the target edge, $w_{old}$ is the initial weight of the target edge, $w_k$ is the weight of the reference edge, and lambda is an interpolation coefficient.

Then, the update unit 403 replaces the initial weight of the target edge in the second state diagram with the target weight of the target edge.

If there are a plurality of reference edges, the update unit 403 separately updates weights of target edges that are the same as the reference edges.

(4) Incentive Unit 404

The incentive unit 404 is configured to configure the updated weight of the target edge in the second state diagram as an incentive weight of a corresponding edge in a language recognition model, the language recognition model being a language model obtained after the large language model is pruned.

The language recognition model is a language model obtained after the large language model is pruned. The incentive unit 404 may prune the large language model, to obtain the language recognition model.

After the weight of the target edge in the second state diagram is updated, the incentive unit 404 configures the updated weight of the target edge in the second state diagram as the incentive weight of the corresponding edge in the language recognition model, that is, configures the updated weight of the target edge in the second state diagram as the incentive weight of the same edge in the language recognition model. The language recognition model is obtained by pruning the large language model. Therefore, all the edges in the language recognition model exist in the state diagram of the large language model. In the language recognition model, the incentive weight of the edge has higher priority than the initial weight of the edge.

For example, the incentive unit 404 establishes a mapping relationship between the target edge in the second state diagram and the corresponding edge in the language recognition model, to configure the target weight of the target edge as the incentive weight of the corresponding edge in the language recognition model.

(5) Recognition Unit 405

The recognition unit 405 is configured to input the to-be-recognized speech into a preset speech recognition model, to obtain word sequence paths outputted by the speech recognition model, the speech recognition model including the language recognition model.

The recognition unit 405 and the loading unit 401 may run simultaneously. Speech recognition is performed while the weight of the textual segment in the language recognition model is enhanced, to implement online speech recognition. Certainly, the recognition unit 405 may alternatively start to run after the incentive unit 404 ends running. The word paths are screened by using the language recognition model in which the weight of the textual segment has been enhanced, to implement offline speech recognition.

The preset speech recognition model may be an HCLG model. H represents a WFST constructed based on a hidden Markov model (HMM), and can map a state number of the HMM to a triphone. C represents a context WFST constructed by expanding a monophone to be a triphone. L represents a WFST constructed based on a pronunciation dictionary, and can convert an input phoneme into a word. G represents a WFST constructed based on a language recognition model, and is used for representing a probability relationship of a context of a word.

The recognition unit 405 inputs the to-be-recognized speech into the speech recognition model, and inputs word elements into the language recognition model WFST after steps such as phoneme recognition and phoneme-to-word conversion, to obtain word sequence paths outputted by the language recognition model WFST.

A word sequence path is formed by edges of the word sequence path in the HMM WFST, the context WFST, the pronunciation dictionary WFST, and the language recognition model WFST.

(6) Result Unit 406

The result unit 406 is configured to select a target path from the word sequence paths according to the incentive weight of the edge in the language recognition model, to obtain a speech recognition result.

The result unit 406 calculates the score of each word sequence path.

Specifically, the score of each word sequence is calculated according to weights of edges in the word sequence path.

Using any word sequence as an example, the result unit 406 obtains edges in the path of the word sequence. A path includes edges in the HMM WFST, the context WFST, the pronunciation dictionary WFST, and the language recognition model WFST.

Then, the result unit 406 obtains weights of the edges of the word sequence path in the HMM WFST, the context WFST, the pronunciation dictionary WFST, and the language recognition model WFST. In addition, it is detected whether the edge of the word sequence path in the language recognition model WFST has an incentive weight.

Descriptions are provided by using any edge of the word sequence path in the language recognition model WFST as an example. If the edge has an incentive weight, an initial weight of the edge is replaced with the incentive weight, to calculate the score of the path. If the edge has no incentive weight, the initial weight of the edge is used to calculate the score of the path.

Therefore, the result unit 406 calculates the score of a word sequence path through summation or multiplication according to the weights of the edges in the word sequence path.

Then, the result unit 406 forms a word sequence according to a word sequence path having a highest score, to obtain a text corresponding to the to-be-recognized speech, that is, a recognition result.

It can be learned from the above that, in this embodiment of this disclosure, the loading unit 401 loads a preset first state diagram and a preset second state diagram, the first state diagram being a state diagram of a key language model, the second state diagram being a state diagram of a large language model; the key phrase unit 402 extracts a reference edge from the first state diagram, and searches the second state diagram for an edge having the same label as the reference edge, to serve as a target edge; the update unit 403 obtains a weight of the reference edge, and updates a weight of the target edge according to the weight of the reference edge; the incentive unit 404 configures the updated weight of the target edge in the second state diagram as an incentive weight of a corresponding edge in a language recognition model, the language recognition model being a language model obtained after the large language model is pruned; the recognition unit 405 inputs a to-be-recognized speech into a preset speech recognition model, to obtain word sequence paths outputted by the speech recognition model, the speech recognition model including the language recognition model; and the result unit 406 selects a target path from the word sequence paths according to the incentive weight of the edge in the language recognition model, to obtain a speech recognition result. A corpus of the key language model is much smaller than a corpus of the large language model. Therefore, a weight of a textual segment edge in the first state diagram is greater than a weight of the same target edge in the second state diagram. In this solution, a weight of a target edge in the first state diagram is used to enhance a weight of the same target edge in the second state diagram, to stimulate a weight of the target edge in the speech recognition model, so that during speech recognition, a weight of an edge in a path that includes a textual segment in the language recognition model is improved, thereby improving a probability that the path that includes the textual segment is used as a recognition result. Therefore, this solution improves a probability of occurrence of a textual segment in a speech recognition result, thereby ensuring the speech recognition speed and improving the accuracy of the speech recognition result. In addition, this solution is applicable to various scenarios, and textual segments in various scenarios may be used to improve the accuracy of a speech recognition result.

Figure 4D:
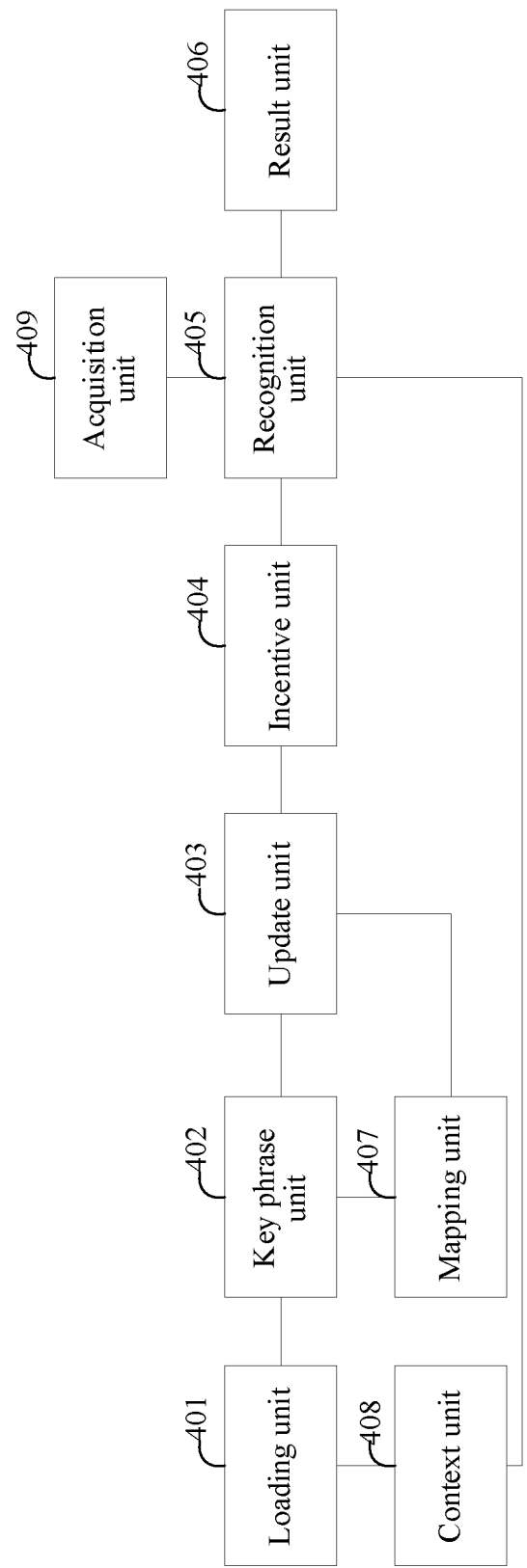
FIG. 4d is a schematic structural diagram of another speech recognition apparatus according to an embodiment of this disclosure.

In some embodiments, referring to FIG. 4d, the speech recognition apparatus may further include a mapping unit 407, a context unit 408, and an acquisition unit 409.

(7) Mapping Unit 407

The mapping unit 407 is configured to map, when an edge having the same label as the reference edge is not found in the second state diagram, the reference edge into the second state diagram, to obtain the target edge.

For example, if the key phrase unit 402 does not find, in the second state diagram, an edge having the same label as a first reference edge, the mapping unit 407 searches for a sequence number of an initial node of the first reference edge in the first state diagram. Then, the mapping unit 407 finds, in the second state diagram, a node corresponding to the sequence number, and establishes a virtual edge that is the same as the first reference edge by using the node as an initial node, to use the virtual edge as a first target edge, thereby implementing mapping of the first reference edge.

If the mapping unit 407 does not find, in recursion edges of the first target edge, an edge having the same label as a second reference edge, the server establishes a virtual edge having the same label as the second reference edge by using an end node of the first target edge as an initial node, to use the virtual edge as a second target edge, thereby implementing mapping of the second reference edge.

Initial weights of the first target edge and the second target edge that are obtained through mapping may be preset values.

(8) Context Unit 408

The context unit 408 is configured to select, from the second state diagram, an edge whose label is the same as a word in a preset word list as an initial edge; obtain an initial weight of the initial edge, and update a weight of the initial edge according to a preset scale factor and the initial weight of the initial edge; and configure the updated weight of the initial edge in the second state diagram as an incentive weight of a corresponding edge in the language recognition model.

The preset word list records the first word obtained after word segmentation is performed on the textual segment.

For example, the context unit 408 may be further specifically configured to perform word segmentation on the textual segment, and configure the first word obtained through word segmentation into the preset word list.

There may be one or more preset textual segments. The context unit 408 performs word segmentation on the textual segments separately, and configures the first words of the textual segments that are obtained through word segmentation into the word list.

During speech recognition, to improve a probability of entering a textual segment path, the context unit 408 selects an edge whose label is the same as a word in the preset word list as the initial edge.

For example, the context unit 408 may calculate a target weight of the initial edge by using the following formula:

$$w_{new} = w_{old} \times (1-l);$$

$w_{new}$ is the target weight of the initial edge, $w_{old}$ is the initial weight of the initial edge, and l is the preset scale factor.

Then, the context unit 408 replaces the initial weight of the initial edge with the target weight of the initial edge, to update the weight of the initial edge.

Therefore, the context unit 408 enhances the weight of the initial edge in the second state diagram.

After the initial edge and the updated weight of the initial edge are obtained, the context unit 408 searches the language recognition model for an edge having the same label as the initial edge and establishes a mapping relationship, and then configures the target weight of the key phrase initial edge as the incentive weight of the corresponding edge in the language recognition model.

(9) Acquisition Unit 409

The acquisition unit 409 is configured to acquire a to-be-recognized speech in real time.

The acquisition unit 409 acquires the to-be-recognized speech in real time, and performs online speech recognition.

It can be learned from the above that, in this application, a weight of a textual segment path in the language recognition model is enhanced by using a weight of the textual segment path in the key language model, to improve the probability of occurrence of the textual segment in a recognition result, thereby improving the accuracy of the speech recognition result. When an edge having the same label as the reference edge is not found in the second state diagram, a target edge is added to the second state diagram in a mapping manner, so that during speech recognition, the mapped target edge can be used, thereby improving a probability of occurrence of the textual segment in the recognition result. In addition, by enhancing the weight of the initial edge, the context is enhanced, so that during language recognition, a probability of finding the textual segment, that is, a probability that the word sequence enters the textual segment path, is improved. Therefore, in this embodiment, the accuracy of speech recognition is improved in a plurality of aspects.

Figure 5A:
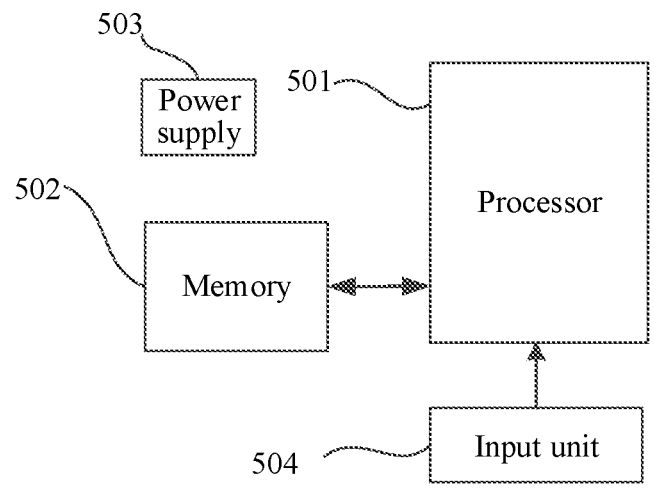
FIG. 5a is a schematic structural diagram of a speech recognition device according to an embodiment of this disclosure.

An embodiment of this disclosure further provides a speech recognition device. FIG. 5a is a schematic structural diagram of a speech recognition device according to an embodiment of this disclosure. Specifically:

The speech recognition device may include components such as a processor 501 with one or more processing cores, a memory 502 with one or more computer-readable storage media, a power supply 503, and an input unit 504. A person skilled in the art may understand that the structure of the speech recognition device shown in FIG. 5a does not constitute a limitation to the device, and the device may include more or fewer components than those shown in the figure, or some components may be combined, or a different component deployment may be used.

The processor 501 is the control center of the speech recognition device, and is connected to various parts of the speech recognition device by using various interfaces and lines. By running or executing software programs and/or modules stored in the memory 502, and invoking data stored in the memory 502, the processor 501 performs various functions and data processing of the speech recognition device, thereby performing overall monitoring on the speech recognition device. In some embodiments, the processor 501 may include one or more processing cores. Preferably, the processor 501 may integrate an application processor and a modem processor. The application processor mainly processes an operating system, a user interface, an application program, and the like, and the modem processor mainly processes wireless communication. It may be understood that alternatively, the modem processor may not be integrated into the processor 501.

The memory 502 may be configured to store a software program and a module, and the processor 501 runs the software program and the module that are stored in the memory 502, to implement various functional applications and data processing. The memory 502 may mainly include a program storage area and a data storage area. The program storage area may store an operating system, an application program required by at least one function (such as a speech recognition function), and the like. The data storage area may store data created according to use of the speech recognition device, and the like. In addition, the memory 502 may include a high-speed random access memory, and may further include a non-transitory memory, such as at least one magnetic disk storage device, a flash memory, or another volatile solid-state storage device. Correspondingly, the memory 502 may further include a memory controller, to allow the processor 501 to access the memory 502.

The speech recognition device may further include the input unit 504. The input unit 504 may be configured to receive inputted numeric or character information. A user may input a textual segment by using the input unit 504.

Although not shown in the figure, the speech recognition device may further include a display unit, and the like. Details are not described herein again. Specifically, in this embodiment, the processor 501 in the speech recognition device may load, according to the following instructions, executable files corresponding to processes of one or more application programs into the memory 502. The processor 501 runs the application programs stored in the memory 502, to implement the following functions:

loading a preset first state diagram and a preset second state diagram, the first state diagram being a state diagram of a key language model, the second state diagram being a state diagram of a large language model; extracting a reference edge from the first state diagram, and searching the second state diagram for an edge having the same label as the reference edge, to serve as a target edge; obtaining a weight of the reference edge, and updating a weight of the target edge according to the weight of the reference edge; configuring the updated weight of the target edge in the second state diagram as an incentive weight of a corresponding edge in a language recognition model, the language recognition model being a language model obtained after the large language model is pruned; inputting a to-be-recognized speech into a preset speech recognition model, to obtain word sequence paths outputted by the speech recognition model, the speech recognition model including the language recognition model; and selecting a target path from the word sequence paths according to the incentive weight of the edge in the language recognition model, to obtain a speech recognition result.

The processor 501 runs the application programs stored in the memory 502, to further implement the following function:

obtaining an initial node of the first state diagram, and determining the reference edge according to a preset traversal depth and the initial node.

The processor 501 runs the application programs stored in the memory 502, to further implement the following functions:

determining an output edge of the initial node as a first reference edge; performing recursion on the first reference edge within a preset recursion depth, to obtain recursion edges of the first reference edge; and determining the recursion edge as a second reference edge when an output label of the recursion edge is not a preset symbol.

The processor 501 runs the application programs stored in the memory 502, to further implement the following functions:

searching the second state diagram for an edge having the same label as the first reference edge, to serve as a first target edge; and searching recursion edges of the first target edge for an edge having the same label as the second reference edge, to serve as a second target edge.

The processor 501 runs the application programs stored in the memory 502, to further implement the following functions:

obtaining a preset interpolation parameter and an initial weight of the target edge; calculating a target weight of the target edge according to the weight of the reference edge, the interpolation parameter, and the initial weight of the target edge; and replacing the initial weight of the target edge in the second state diagram with the target weight.

The processor 501 runs the application programs stored in the memory 502, to further implement the following function:

mapping, when an edge having the same label as the reference edge is not found in the second state diagram, the reference edge into the second state diagram, to obtain the target edge.

The processor 501 runs the application programs stored in the memory 502, to further implement the following functions:

selecting, from the second state diagram, an edge whose label is the same as a word in a preset word list as an initial edge; obtaining an initial weight of the initial edge, and updating a weight of the initial edge according to a preset scale factor and the initial weight of the initial edge; and configuring the updated weight of the initial edge in the second state diagram as an incentive weight of a corresponding edge in the language recognition model.

The processor 501 runs the application programs stored in the memory 502, to further implement the following function:

performing word segmentation on the textual segment, and configuring the first word obtained through word segmentation into the preset word list.

The processor 501 runs the application programs stored in the memory 502, to further implement the following functions:

obtaining a preset textual segment, training the key language model according to the textual segment, constructing a weighted finite-state transducer of the key language model, and obtaining a state diagram indicated by the weighted finite-state transducer of the key language model as the first state diagram.

The processor 501 runs the application programs stored in the memory 502, to further implement the following functions:

obtaining a preset general corpus, training the large language model according to the general corpus, constructing a weighted finite-state transducer of the large language model, and obtaining a state diagram indicated by the weighted finite-state transducer of the large language model as the second state diagram.

Figure 5B:
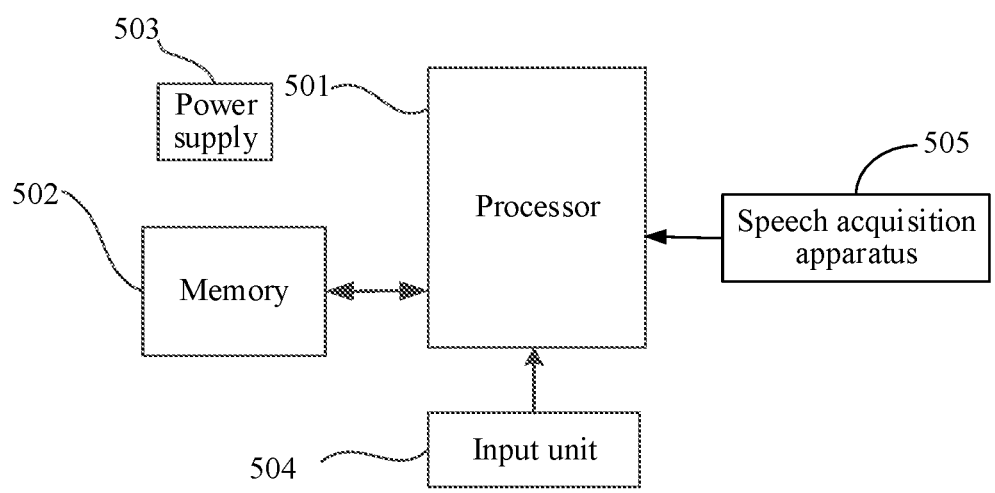
FIG. 5b is a schematic structural diagram of a speech recognition device according to an embodiment of this disclosure.

In addition, referring to FIG. 5*b*, the speech recognition device may further include a speech acquisition apparatus 505, for example, a microphone, configured to acquire a to-be-recognized speech in real time.

The processor 501 runs the application programs stored in the memory 502, to further implement the following function:

acquiring a to-be-recognized speech in real time.

For specific implementations of the foregoing operations, refer to the foregoing embodiments. Details are not described herein again.

A person of ordinary skill in the art may understand that, all or some steps of the methods of the foregoing embodiments may be implemented through instructions, or implemented through instructions controlling relevant hardware, and the instructions may be stored in a computer-readable storage medium and loaded and executed by a processor.

Accordingly, an embodiment of this disclosure provides a storage medium, storing a plurality of instructions, the instructions being capable of being loaded by a processor, to perform steps in any speech recognition method according to the embodiments of this disclosure. For example, the instructions may perform the following steps:

loading a preset first state diagram and a preset second state diagram, the first state diagram being a state diagram of a key language model, the second state diagram being a state diagram of a large language model; extracting a reference edge from the first state diagram, and searching the second state diagram for an edge having the same label as the reference edge, to serve as a target edge; obtaining a weight of the reference edge, and updating a weight of the target edge according to the weight of the reference edge; configuring the updated weight of the target edge in the second state diagram as an incentive weight of a corresponding edge in a language recognition model, the language recognition model being a language model obtained after the large language model is pruned; inputting a to-be-recognized speech into a preset speech recognition model, to obtain word sequence paths outputted by the speech recognition model, the speech recognition model including the language recognition model; and selecting a target path from the word sequence paths according to the incentive weight of the edge in the language recognition model, to obtain a speech recognition result.

The instructions may further perform the following step:

obtaining an initial node of the first state diagram, and determining the reference edge according to a preset traversal depth and the initial node.

The instructions may further perform the following steps:

determining an output edge of the initial node as a first reference edge; performing recursion on the first reference edge within a preset recursion depth, to obtain recursion edges of the first reference edge; and determining the recursion edge as a second reference edge when an output label of the recursion edge is not a preset symbol.

The instructions may further perform the following steps: searching the second state diagram for an edge having the same label as the first reference edge, to serve as a first target edge; and searching recursion edges of the first target edge for an edge having the same label as the second reference edge, to serve as a second target edge.

The instructions may further perform the following steps: obtaining a preset interpolation parameter and an initial weight of the target edge; calculating a target weight of the target edge according to the weight of the reference edge, the interpolation parameter, and the initial weight of the target edge; and replacing the initial weight of the target edge in the second state diagram with the target weight.

The instructions may further perform the following step: mapping, when an edge having the same label as the reference edge is not found in the second state diagram, the reference edge into the second state diagram, to obtain the target edge.

The instructions may further perform the following steps: selecting, from the second state diagram, an edge whose label is the same as a word in a preset word list as an initial edge; obtaining an initial weight of the initial edge, and updating a weight of the initial edge according to a preset scale factor and the initial weight of the initial edge; and configuring the updated weight of the initial edge in the second state diagram as an incentive weight of a corresponding edge in the language recognition model.

The instructions may further perform the following step: performing word segmentation on the textual segment, and configuring the first word obtained through word segmentation into the preset word list.

The instructions may further perform the following steps: obtaining a preset textual segment, training the key language model according to the textual segment, constructing a weighted finite-state transducer of the key language model, and obtaining a state diagram indicated by the weighted finite-state transducer of the key language model as the first state diagram.

The instructions may further perform the following steps: obtaining a preset general corpus, training the large language model according to the general corpus, constructing a weighted finite-state transducer of the large language model, and obtaining a state diagram indicated by the weighted finite-state transducer of the large language model as the second state diagram.

The instructions may further perform the following step: acquiring a to-be-recognized speech in real time.

For specific implementations of the foregoing operations, refer to the foregoing embodiments. Details are not described herein again.

The storage medium may include a read-only memory (ROM), a random access memory (RAM), a magnetic disk, an optical disc, or the like.

Because the instructions stored in the storage medium may perform the steps of any speech recognition method provided in the embodiments of this disclosure, the instructions can implement beneficial effects that may be implemented by any speech recognition method provided in the embodiments of this disclosure. For details, reference may be made to the foregoing embodiments. Details are not described herein again.

What is claimed is:

1. A method for speech recognition, performed by a computing device, comprising:
   extracting a reference edge from a first state diagram, and searching a second state diagram for a target edge having a same label and a same prefix path as the reference edge, wherein: the first state diagram is a state diagram of a key phrase language model of a textual segment; the second state diagram is a state diagram of a basic language model; the first state diagram includes a plurality of nodes and at least one path for transitioning from one node to another node; and the first state diagram is used as a reference to modify the second state diagram;
   adjusting, by using a weight of the reference edge that represents a relationship between at least one pair of elements in the first state diagram, a weight of the target edge;
   mapping an incentive weight of an edge in a language recognition model corresponding to the target edge in the second state diagram to the adjusted weight of the target edge, the language recognition model being a language model obtained after the basic language model is pruned;
   inputting a to-be-recognized speech into a speech recognition model comprising the language recognition model;
   obtaining word sequence paths outputted by the speech recognition model for the to-be-recognized speech;
   determining that a first edge in each word sequence path in the word sequence paths has a mapped incentive weight at an edge level;
   determining that a second edge in the each of the word sequence paths in the word sequence paths does not have a mapped incentive weight at the edge level;
   calculating a score of the each of the word sequence path based on the mapped incentive weight of the first edge and an initial weight of the second edge; and
   selecting a target path from the word sequence paths which has a highest score based on the calculated score of each of the word sequence paths in the word sequence paths, to obtain the speech recognition result.

2. The method according to claim 1, further comprising:
   in response to the target edge having the same label and the same prefix path as the reference edge being not found, adding an edge corresponding to the reference edge in the first state diagram as the target edge in the second state diagram.

3. The method according to claim 1, wherein extracting the reference edge from the first state diagram comprises:
   obtaining an initial node of the first state diagram, and determining the reference edge according to a preset traversal depth and the initial node.

4. The method according to claim 3, wherein:
   the reference edge comprises a first reference edge and a second reference edge; and
   determining the reference edge according to the preset traversal depth and the initial node comprises:
      determining an output edge of the initial node as the first reference edge;
      performing recursion on the first reference edge within a preset recursion depth, to obtain recursion edges of the first reference edge; and
      determining the recursion edge as the second reference edge when an output label of the recursion edge is not a preset symbol.

5. The method according to claim 4, wherein:
the target edge comprises a first target edge and a second target edge;
searching the second state diagram for the target edge comprises:
   searching the second state diagram for an edge having the same label as the first reference edge, to serve as the first target edge; and
   searching the recursion edges of the first target edge for an edge having the same label as the second reference edge, to serve as the second target edge; and
obtaining the weight of the reference edge, and updating the weight of the target edge according to the weight of the reference edge comprises:
   obtaining the weight of the first reference edge, and updating the weight of the first target edge according to the weight of the first reference edge; and
   obtaining the weight of the second reference edge, and updating the weight of the second target edge according to the weight of the second reference edge.

6. The method according to claim 1, wherein updating the weight of the target edge comprises:
obtaining a preset interpolation parameter and an initial weight of the target edge;
calculating a target weight of the target edge according to the weight of the reference edge, the interpolation parameter, and the initial weight of the target edge; and
replacing the initial weight of the target edge in the second state diagram with the target weight.

7. The method according to claim 1, further comprising:
selecting, from the second state diagram, an edge whose label is the same as a word in a preset word list as an initial edge;
obtaining an initial weight of the initial edge, and updating a weight of the initial edge according to a preset scale factor and the initial weight of the initial edge; and
setting an incentive weight of an edge in the language recognition model corresponding to the initial edge in the second state diagram as the updated weight of the initial edge in the second state diagram.

8. The method according to claim 7, wherein before the selecting, from the second state diagram, an edge whose label is the same as a word in a preset word list as an initial edge, the method comprises:
performing word segmentation on the textual segment, and configuring a first word obtained through word segmentation into the preset word list.

9. The method according to claim 1, further comprising:
obtaining a sample textual segment, and training the language model of the sample textual segment according to the textual segment; and
constructing a weighted finite-state transducer of the language model of the sample textual segment, and obtaining a state diagram indicated by the weighted finite-state transducer as the first state diagram.

10. The method according to claim 1, further comprising:
obtaining a preset general corpus, and training the basic language model according to the preset general corpus; and
constructing a weighted finite-state transducer of the basic language model, and obtaining a state diagram indicated by the weighted finite-state transducer as the second state diagram.

11. A device for speech recognition, comprising a memory for storing computer instructions and a processor in communication with the memory, wherein, when the processor executes the computer instructions, the processor is configured to cause the device to:
extract a reference edge from a first state diagram, and search a second state diagram for a target edge having a same label and a same prefix path as the reference edge, wherein: the first state diagram is a state diagram of a key phrase language model of a textual segment; the second state diagram is a state diagram of a basic language model; the first state diagram includes a plurality of nodes and at least one path for transitioning from one node to another node; and the first state diagram is used as a reference to modify the second state diagram;
adjust, by using a weight of the reference edge that represents a relationship between at least one pair of elements in the first state diagram, a weight of the target edge;
map an incentive weight of an edge in a language recognition model corresponding to the target edge in the second state diagram to the adjusted weight of the target edge, the language recognition model being a language model obtained after the basic language model is pruned;
input a to-be-recognized speech into a speech recognition model comprising the language recognition model;
obtain word sequence paths outputted by the speech recognition model for the to-be-recognized speech;
for each edge in each word sequence path in the word sequence paths
   detect, at an edge level, whether each edge in each word sequence path has a mapped incentive weight;
   in response to each edge in each word sequence path having the mapped incentive weight, calculate a score of each word sequence path based on the mapped incentive weight; and
   in response to each edge in each word sequence path not having the mapped incentive weight, calculate a score of the each word sequence path based on an initial weight of each edge in each word sequence path; and
select a target path from the word sequence paths which has a highest score based on the calculated score of each word sequence path, to obtain the speech recognition result.

12. The device according to claim 11, wherein the processor is configured to further cause the device to:
in response to the target edge having the same label and the same prefix path as the reference edge being not found, add an edge corresponding to the reference edge in the first state diagram as the target edge in the second state diagram.

13. The device according to claim 11, wherein, when the processor is configured to cause the device to extract the reference edge from the first state diagram, the processor is configured to cause the device to:
obtain an initial node of the first state diagram, and determine the reference edge according to a preset traversal depth and the initial node.

14. The device according to claim 13, wherein:
the reference edge comprises a first reference edge and a second reference edge; and
when the processor is configured to cause the device to determine the reference edge according to the preset traversal depth and the initial node, the processor is configured to cause the device to:

determine an output edge of the initial node as the first reference edge;

perform recursion on the first reference edge within a preset recursion depth, to obtain recursion edges of the first reference edge; and determine the recursion edge as the second reference edge when an output label of the recursion edge is not a preset symbol.

15. The device according to claim 14, wherein:

the target edge comprises a first target edge and a second target edge;

when the processor is configured to cause the device to search the second state diagram for the target edge, the processor is configured to cause the device to:

search the second state diagram for an edge having the same label as the first reference edge, to serve as the first target edge; and search the recursion edges of the first target edge for an edge having the same label as the second reference edge, to serve as the second target edge; and when the processor is configured to cause the device to obtain the weight of the reference edge, and updating the weight of the target edge according to the weight of the reference edge, the processor is configured to cause the device to:

obtain the weight of the first reference edge, and update the weight of the first target edge according to the weight of the first reference edge; and obtain the weight of the second reference edge, and update the weight of the second target edge according to the weight of the second reference edge.

16. A non-transitory storage medium for storing computer readable instructions, the computer readable instructions, when executed by a processor, causing the processor to:

extract a reference edge from a first state diagram, and search a second state diagram for a target edge having a same label and a same prefix path as the reference edge, wherein: the first state diagram is a state diagram of a key phrase language model of a textual segment; the second state diagram is a state diagram of a basic language model; the first state diagram includes a plurality of nodes and at least one path for transitioning from one node to another node; and the first state diagram is used as a reference to modify the second state diagram;

adjust, by using a weight of the reference edge that represents a relationship between at least one pair of elements in the first state diagram, a weight of the target edge;

map an incentive weight of an edge in a language recognition model corresponding to the target edge in the second state diagram to the adjusted weight of the target edge, the language recognition model being a language model obtained after the basic language model is pruned;

input a to-be-recognized speech into a speech recognition model comprising the language recognition model;

obtain word sequence paths outputted by the speech recognition model for the to-be-recognized speech;

for each edge in each word sequence path in the word sequence paths:

detect, at an edge level, whether each edge in each word sequence path has a mapped incentive weight;

in response to each edge in each word sequence path having the mapped incentive weight, calculate a score of each word sequence path based on the mapped incentive weight; and in response to each edge in each word sequence path not having the mapped incentive weight, calculate a score of each word sequence path based on an initial weight of each edge in each word sequence path; and select a target path from the word sequence paths which has a highest score based on the calculated score of each word sequence path, to obtain the speech recognition result.

\* \* \* \* \*